(12) United States Patent
Columbia

(10) Patent No.: US 8,276,932 B2
(45) Date of Patent: Oct. 2, 2012

(54) MULTI-TASK TRAILER HITCH ASSEMBLY

(76) Inventor: John R. Columbia, Brownsville, PA (US)

( * ) Notice: Subject to any disclaimer, the term of this patent is extended or adjusted under 35 U.S.C. 154(b) by 0 days.

(21) Appl. No.: 12/853,618

(22) Filed: Aug. 10, 2010

(65) Prior Publication Data

US 2010/0320728 A1  Dec. 23, 2010

Related U.S. Application Data

(62) Division of application No. 11/372,748, filed on Mar. 10, 2006, now Pat. No. 7,784,813.

(60) Provisional application No. 60/723,858, filed on Oct. 5, 2005, provisional application No. 60/687,517, filed on Jun. 3, 2005, provisional application No. 60/682,774, filed on May 19, 2005, provisional application No. 60/660,339, filed on Mar. 11, 2005.

(51) Int. Cl.
    *B60D 1/06* (2006.01)
(52) U.S. Cl. .................. 280/511; 280/495; 280/504
(58) Field of Classification Search ................. None
    See application file for complete search history.

(56) References Cited

U.S. PATENT DOCUMENTS

| | | |
|---|---|---|
| 2,142,365 A | 1/1939 | McKee |
| 3,181,893 A | 5/1965 | Jopson et al. |
| 3,655,221 A | 4/1972 | Warner |
| 3,801,134 A | 4/1974 | Dees |
| 3,922,006 A | 11/1975 | Borges |
| 3,963,264 A | 6/1976 | Down |
| 4,202,562 A | 5/1980 | Sorenson |
| 4,412,635 A | 11/1983 | Bateman |
| 4,856,686 A | 8/1989 | Workentine |
| 4,938,496 A | 7/1990 | Thomas et al. |
| 5,135,247 A | 8/1992 | Alfaro et al. |

(Continued)

FOREIGN PATENT DOCUMENTS

WO  9714606 A1  4/1997

OTHER PUBLICATIONS http://www.expressdistributing.com/cart/cgi-bin/Html/Products/tow bmnts spcl prod 03.htm, Speciality Ball Mounts; (6 pages); printed Sep. 27, 2004.

*Primary Examiner* — Paul N Dickson
*Assistant Examiner* — Marlon Arce
(74) *Attorney, Agent, or Firm* — The Webb Law Firm

(57) ABSTRACT

The multi-task trailer hitch assembly of the present invention provides receiving tubes for the attachment of one or more trailer hitch-mounted receiver-type accessories while retaining a trailer hitch for pulling a trailer in the single hitch receiver provided on many trucks and ATVs. This permits the simultaneous use of multiple accessories while retaining the concurrent ability to tow. Multiple receiver tubes can be provided, both horizontal and vertical, and oriented not only toward the rear but also at right angles from the ball mount. This permits fastening one or more attachments from not only the rear but also from the top and inward from both sides toward the ball mount. Extra hitch ball mounts and other towing accessories may also be conveniently stored in the receiver tubes of the present invention while towing with a particular Class II or Class III hitch ball mount in the appropriate vehicle-mounted hitch receiver.

6 Claims, 21 Drawing Sheets

U.S. PATENT DOCUMENTS

| | | | |
|---|---|---|---|
| 5,149,122 A | 9/1992 | Helber | |
| 5,358,269 A * | 10/1994 | Jakeman et al. | 280/490.1 |
| 5,397,147 A | 3/1995 | Ducharme et al. | |
| 5,421,601 A * | 6/1995 | Hinze et al. | 280/507 |
| 5,465,991 A | 11/1995 | Kass et al. | |
| 5,476,279 A | 12/1995 | Klemetsen | |
| 5,562,298 A | 10/1996 | Kass et al. | |
| D376,780 S * | 12/1996 | McCoy | D12/162 |
| 5,630,606 A | 5/1997 | Ryan | |
| 5,649,656 A | 7/1997 | Davy | |
| 5,735,539 A * | 4/1998 | Kravitz | 280/506 |
| 5,823,560 A | 10/1998 | Van Vleet | |
| 5,845,832 A | 12/1998 | Eichmann | |
| 5,857,693 A | 1/1999 | Clark, Jr. | |
| 5,884,930 A | 3/1999 | Cluth | |
| 5,915,714 A | 6/1999 | Bell et al. | |
| 5,934,698 A | 8/1999 | Despain | |
| 6,089,431 A | 7/2000 | Heyworth | |
| 6,125,945 A | 10/2000 | Skaggs et al. | |
| 6,126,188 A | 10/2000 | Volodarsky | |
| 6,244,483 B1 | 6/2001 | McLemore et al. | |
| 6,312,004 B1 * | 11/2001 | Kiss | 280/507 |
| 6,390,489 B1 * | 5/2002 | Friesen | 280/504 |
| 6,443,345 B1 | 9/2002 | Bloemer et al. | |
| 6,460,870 B2 * | 10/2002 | Moss | 280/491.3 |
| 6,502,730 B2 | 1/2003 | Johnson | |
| 6,502,845 B1 * | 1/2003 | Van Vleet | 280/491.1 |
| 6,511,088 B2 | 1/2003 | Kahlstorf | |
| 6,536,794 B2 | 3/2003 | Hancock et al. | |
| 6,595,540 B1 | 7/2003 | MacKarvich | |
| 6,709,002 B2 | 3/2004 | Tambornino | |
| 6,802,441 B1 | 10/2004 | DuRant et al. | |
| 6,802,523 B1 | 10/2004 | Profitt | |
| 6,857,545 B2 | 2/2005 | McLemore et al. | |
| 6,866,285 B1 | 3/2005 | Stamp | |
| 6,874,804 B2 * | 4/2005 | Reese et al. | 280/477 |
| D508,221 S * | 8/2005 | Rebick | D12/162 |
| 6,969,085 B2 * | 11/2005 | Causey, Jr. | 280/507 |
| 6,979,015 B1 | 12/2005 | Eberle | |
| 7,021,643 B1 * | 4/2006 | Buchanan | 280/416.1 |
| 7,052,032 B1 | 5/2006 | Adair | |
| 7,258,359 B2 | 8/2007 | Wooten | |
| 7,347,441 B2 | 3/2008 | Rosario | |
| 7,431,320 B2 * | 10/2008 | Madden et al. | 280/507 |
| 7,472,916 B2 | 1/2009 | Varcoe | |
| 7,566,067 B1 * | 7/2009 | Alexander | 280/415.1 |
| 2003/0015856 A1 | 1/2003 | Hancock et al. | |
| 2003/0205599 A1 | 11/2003 | Brown | |
| 2003/0222426 A1 | 12/2003 | Rosenlund | |
| 2004/0201201 A1 * | 10/2004 | Causey, Jr. | 280/511 |
| 2005/0179241 A1 | 8/2005 | McManus | |
| 2006/0186639 A1 | 8/2006 | Rosario | |
| 2006/0214391 A1 | 9/2006 | Columbia | |
| 2007/0252360 A1 | 11/2007 | Wooten | |
| 2009/0218789 A1 | 9/2009 | Beck | |
| 2009/0302574 A1 | 12/2009 | Columbia | |
| 2010/0007116 A1 | 1/2010 | Columbia | |
| 2010/0044999 A1 | 2/2010 | Columbia | |

\* cited by examiner

MULTI-TASK TRAILER HITCH ASSEMBLY

CROSS REFERENCE TO RELATED APPLICATIONS

This application is a divisional of U.S. application Ser. No. 11/372,748, filed Mar. 10, 2006 (now U.S. Pat. No. 7,784, 813) which claims the benefits of U.S. Provisional Application No. 60/723,858, filed Oct. 5, 2005; U.S. Provisional Application No. 60/687,517, filed Jun. 3, 2005; U.S. Provisional Application No. 60/682,774, filed May 19, 2005; and U.S. Provisional Application No. 60/660,339, filed Mar. 11, 2005, all of which applications are herein incorporated by reference in their entirety.

BACKGROUND OF THE INVENTION

1. Field of the Invention

The present invention relates to trailer hitch ball mounts. More particularly, the present invention relates to the ball mount, the hitch ball, and accessory receiver tubes having a mount for mounting on (1) the shank of trailer hitch ball mounts, (2) the shank of hitch accessories, including but not limited to the accessories described herein below, or (3) the shank or body of receiver/ball mount extensions.

2. Description of the Related Art

In recent years, the number and variety of automotive and truck accessories and attachments that are secured to a vehicle via a hitch receiver has increased. However, use of these accessories has been limited since a conventional receiver-type hitch historically consisted of only a single receiver tube. As such, utilizing an accessory precluded the ability to tow since use of an accessory necessitated removing the ball mount to insert a different accessory, such as a bicycle carrier, canoe rack, step, carry all, etc. It would be desirable to provide for the attachment of multiple accessories or at least one accessory to a trailer hitch ball mount or the like, allowing the trailer tongue to remain hitched to the hitch ball while maintaining the accessory supported for use.

Additionally, although some all-terrain-vehicle (ATV) manufacturers have begun installing hitch receivers, as opposed to hitch bars, on their ATVs, due to a hitch's mutually exclusive use design, most ATV accessories continue to be designed to attach to the ATV's rack system, leaving the single receiver hitch cavity available for its primary intended purpose, i.e., housing a ball mount for towing.

Although accessory attachment via the rack can be effective, with few exceptions, the accessories are generally not quickly attached or detached. They are generally bolted to the rack system and require the use of tools for installation and removal.

As can easily be recognized by one skilled in the art, hitch assemblies, attachments, accessories and implements for ATVs and lawn and garden tractors need not necessarily be of the same strength and/or rating s those designed for automotive use. Hitch assemblies and attachments for these off-road tow vehicles may be designed from less-expensive, lighter-duty materials and still function properly and serve their intended purpose. However, some hitch manufacturers are reluctant to produce less-expensive hitch assemblies and attachments made exclusively for ATV and/or lawn and garden tractor use, considering consumers unskilled in the art could inadvertently and inappropriately use a lighter-duty assembly not designed for automotive use on a car, truck, sport utility vehicle, etc., creating an unsafe condition. The misuse of a less-expensive hitch assembly designed exclusively for off-road use can be avoided, however, by modifying a standard feature on most conventional receiver-type hitches and corresponding ball mounts, draw bars, etc.

Thus, a multi-task trailer hitch assembly solving at least some of the aforementioned problems is desired.

SUMMARY OF THE INVENTION

A hitch assembly of the present invention comprises a shank that is configured to engage a hitch receiver. At least one support is connected to the shank. At least one receiver tube is connected to the support and is spaced from the shank.

A hitch attachment assembly of the present invention comprises a shank collar and is configured to engage a shank. A receiver tube support member extends from the shank collar. At least one first receiver tube is connected to the support.

Another hitch assembly of the present invention comprises a tongue extender bar having a rear portion and a forward portion. The forward portion has a connecting element configured to engage a hitch bar of a vehicle. A receiver tube support is connected to the rear portion of the tongue extender bar. At least one receiver tube is connected to the receiver tube support.

A further hitch assembly of the present invention comprises a platform having a ball mount. A shank is connected to the ball mount platform and is configured to engage a hitch receiver. The shank has an upper flange, a lower flange, and a web located between the upper and lower flanges.

A still further hitch assembly of the present invention comprises a shank collar configured to engage a hitch shank. A receiver tube support member extends from the shank sleeve. At least one first receiver tube is connected to the support. At least one second receiver tube is connected to the support at a spaced distance from the first receiver tube.

A multi-task trailer hitch assembly of the present invention provides receiving tubes for the attachment of one or more trailer hitch-mounted receiver-type accessories while retaining a trailer hitch for pulling a trailer in the single hitch receiver provided on many trucks and ATVs, as well as a heavier-duty, more versatile ball mount and more secure ball connection. This permits the simultaneous use of multiple accessories while retaining the concurrent ability to tow. The inventive multi-task trailer hitch assembly is easily transferable from truck to ATV to sport utility vehicle (SUV), etc., regardless of vehicle make or model.

The sizes of square hitch receivers are commonly 1¼ inch (3.2 cm) square (Class II), and 2 inches (5 cm) square (Class III). The present invention includes a combination of both 1¼ inch-(3.2 cm) and 2-inch (5 cm) receiver tubes to permit attaching accessories made to fit Class II and Class III hitch receivers. However, it is to be understood that other size receiver tubes could be utilized in the practice of the invention. The present invention can provide multiple receiver tubes both horizontally and vertically and oriented not only toward the rear but also at angles, e.g., right angles, from the ball mount. This permits fastening one or more attachments from not only the rear but also from the top and inwardly from both sides toward the ball mount. Articles, such as extra hitch ball mounts and other towing accessories, may also be conveniently stored in the receiver tubes of the present invention while towing with a particular Class II or Class III hitch ball mount in the appropriate vehicle-mounted hitch receiver. This allows the easy change of ball mounts for use based on the nature, size, and weight of the trailer or item to be towed since a heavy travel trailer requires a larger ball than a light boat or utility trailer.

The present invention also allows the convenient stowage of unused receiver attachments, such as receiver tow hooks, shackles, adapters, and other ball mounts.

In various embodiments, one component of the present invention fits over the exposed shank of a ball mount between the ball mount platform and the hitch receiver when the ball mount shank is engaged by the hitch receiver of a vehicle for towing a trailer. This exposed shank is common in the design of many commercial hitch systems. In another embodiment, the same component of the present invention fits over a receiver/ball extension when the use of a receiver/ball mount extension is desirable. In yet another embodiment, as a product improvement, the same component of the present invention fits over or on a hitch accessory other than a ball mount or extension when the use of a different accessory is desirable.

Owing to the additional weight of the accessories to be supported and to provide a more versatile hitch assembly, in various embodiments, the multi-task trailer hitch assembly also includes a heavier-duty ball mount and more secure ball connection.

In one embodiment of the invention, a lower 2 inch (5 cm) collar fits over the exposed ball mount shank, and two parallel receiver tubes are supported by side walls extending upwardly from the lower collar, the central receiver tube being of a 1¼ inch (3.2 cm) size and an upper receiver tube being of a 2 inch (5 cm) size. The upper receiver tube may also be of a 1¼ inch (3.2 cm) size, allowing the inventive assembly to be inverted and the assembly mounted on a 1¼ inch (3.2 cm) shank, the upper tube serving as a shank collar. A tongue-type hitch may be mounted below the shank and ball mount platform, which also serves to keep the inventive assembly from shifting forward or to the rear along the ball mount shank.

In another embodiment, a hollow cross bar is attached to the lower side of the collar of the first embodiment, the cross bar acting as perpendicular receiver tubes. Additional receiver tubes can be mounted below the respective end portions of the hollow cross bar and open rearwardly. Also, vertical receiver tubes can be mounted on the upper walls at respective end portions of the cross bar and open upwardly. A vertical receiver tube can be provided, which opens upwardly and attaches to the forward portion of the first embodiment described above.

In another embodiment, hollow cross bars are attached above and below the collar of the first embodiment, the cross bars acting as four perpendicular receiver tubes. Rearward-opening receiver tubes are mounted between upper and lower cross bars near the ends thereof. Upward-opening receiver tubes are mounted to the upper cross bars above the rearward-opening receiver tubes. The side walls of the first embodiment are attached to the center portion of the upper cross bar and extend upward therefrom.

In other embodiments, the invention as described in the previous three embodiments fits over a receiver/ball mount extension, reducer or adapter, or other hitch accessories, rather than on a ball mount shank when the use of one of these accessories is desirable.

Another embodiment of the present invention provides receiver tubes mounted on a tongue-type hitch extension for use with ATVs, lawn and garden tractors, and other vehicles having a tongue-type hitch ball mount rather than a hitch receiver.

It is widely recognized that to permit ease of sliding ball mounts and other accessories into a hitch receiver, the outside dimension of ball mount and accessory shanks are slightly smaller than the inside dimension of receiver tubes in which they are inserted. While this space is desirable for ease of attachment insertion and withdrawal, it is undesirable for achieving snug connections. Too much space between a receiver tube and an accessory shank can cause the accessory to wobble beyond a tolerable amount, and the condition worsens with each subsequent connection. Since the multi-task trailer hitch assembly's primary purpose is to attach additional accessories, at least some of the embodiments of the multi-task trailer hitch assembly include inventive and conjunctive "shank expander strips" to ensure optimal connections.

It is an aspect of the invention to provide improved elements and arrangements thereof for the purposes described which is inexpensive, dependable, and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
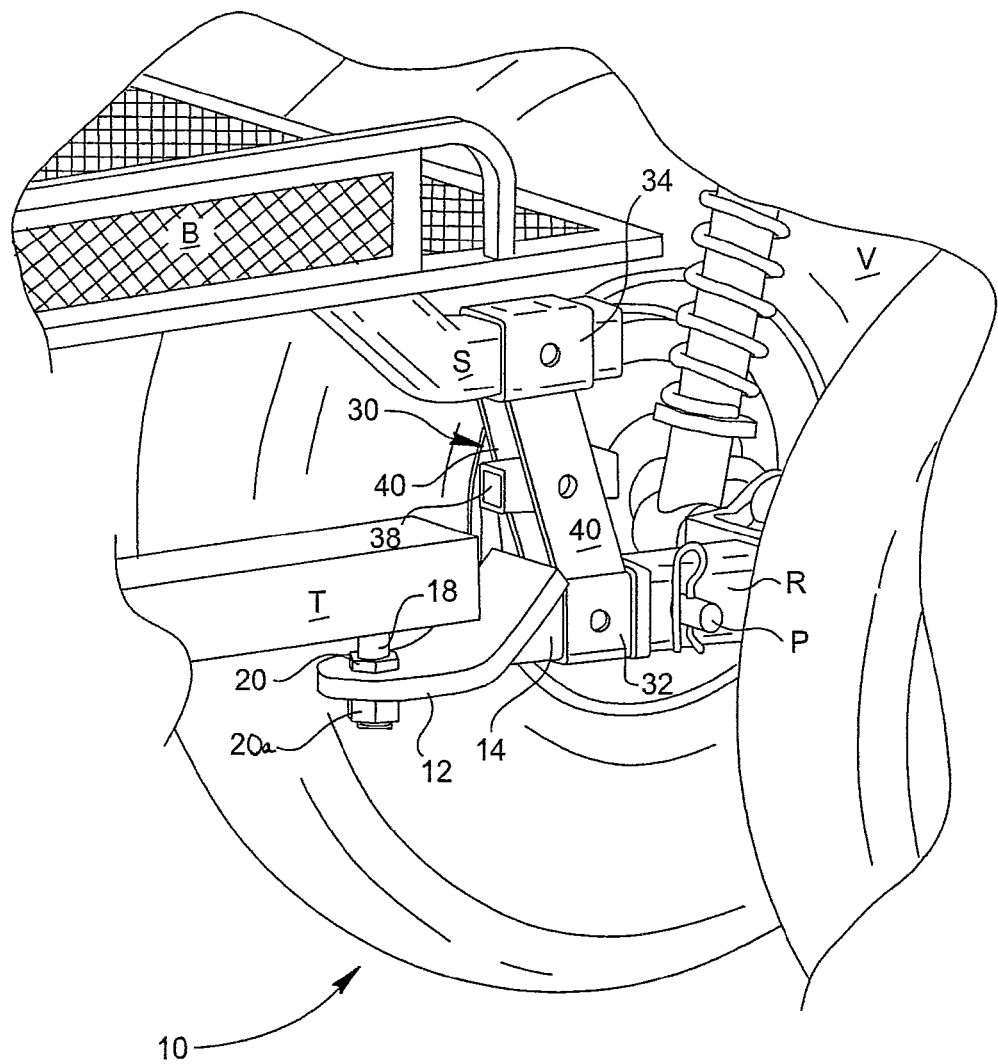
FIG. 1 is a perspective view of the multi-task trailer hitch assembly utilizing an existing standard ball mount and trailer ball according to the present invention.

As used herein, spatial or directional terms, such as "top", "bottom", "left", "right", "over", "under", "front", "rear", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification, figures, and claims are to be understood as being modified in all instances by the term "about". Accordingly, unless indicated to the contrary, the numerical values set forth in the following specification, figures, and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. The dimensions set forth on the accompanying drawing figures are for one exemplary embodiment of the invention and it is to be understood that the invention is not limited to the specifically disclosed dimensions.

The multi-task trailer hitch assembly of the present invention allows the attachment of one or more trailer hitch-mounted receiver-type accessories while retaining a trailer hitch for pulling a trailer in the single hitch receiver provided on many trucks and ATVs. The inventive assembly may also be employed for storage of extra hitches of differing types.

Referring to FIG. 1, there is shown an environmental perspective view of a first embodiment of the inventive multi-task trailer hitch assembly system referred to by the reference number 10. Hitch attachment assembly 10 is shown mounted on standard tube-type hitch mount shank 14 by means of shank collar or sleeve 32 between hitch ball mount platform 12 and hitch receiver R in which the forward end portion of shank 14 is secured by hitch pin P. Ball mount platform 12 is shown having a trailer tongue ball receiver T mounted on ball 16 (see FIG. 2A) and mounted by ball shank 18 and ball mounting nuts 20 and 20a. Hitch receiver R is mounted on vehicle V (shown as an ATV).

Shank collar 32 has upright receiver tube support members 40 extending upwardly and rearwardly therefrom. An upper 2 inch (5 cm) receiver tube 34 is mounted at the upper ends of support members 40 and is shown as holding shank S of basket attachment B. A hitch pin may be inserted to provide secure attachment of receiver tube 34 over shank S as desired. A 1¼ inch (3.2 cm) central receiver tube 38 is mounted parallel to and between shank collar 32 and upper attachment receiver tube 34 and attached between receiver tube support members 40, such as by welding.

Figure 2A:
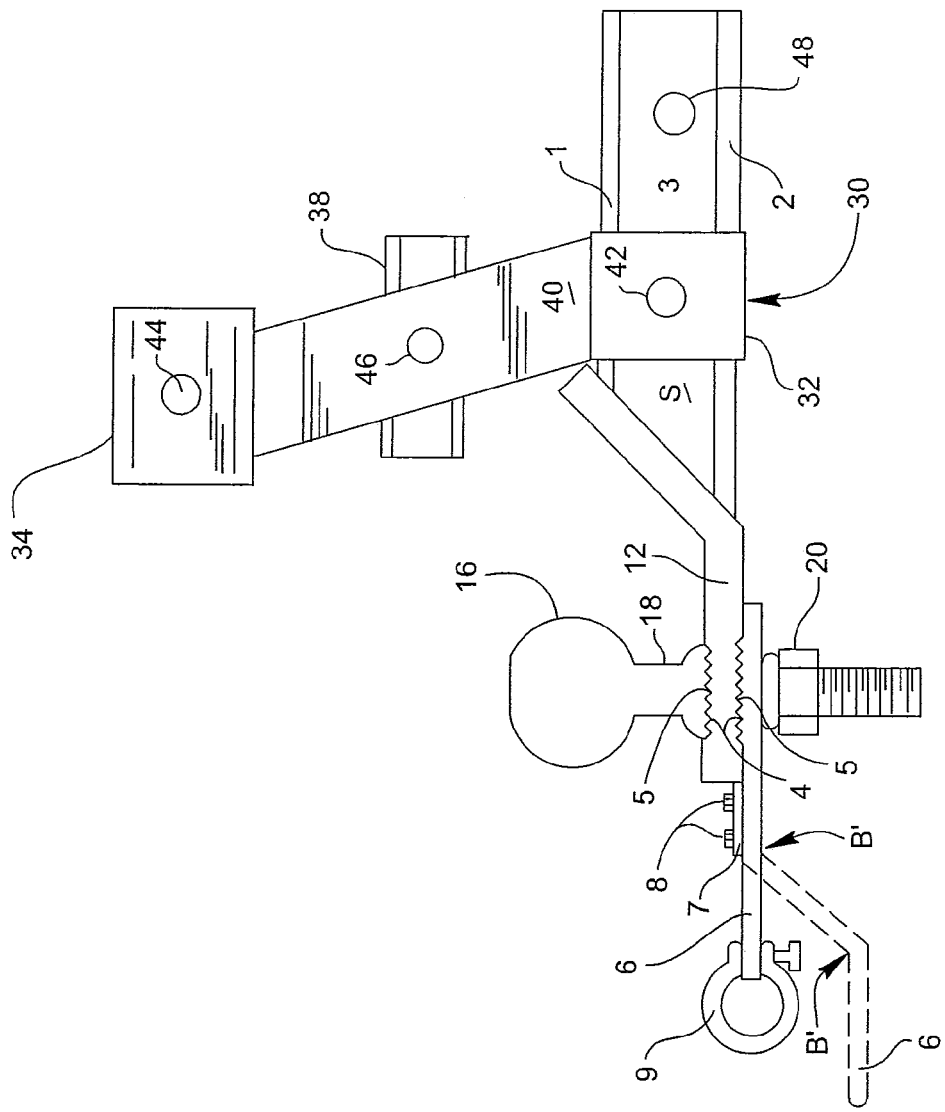
FIG. 2A is a side elevational view of the multi-task trailer hitch assembly of FIG. 1, modified to include a tongue extension tab, a ball mount platform with a broached surface at a ball connection area, a corresponding broached surface on a trailer ball, and a heavier-duty ball mount shank constructed in an "H-beam" fashion, including an upper flange, lower flange, and web.
Figure 3A:
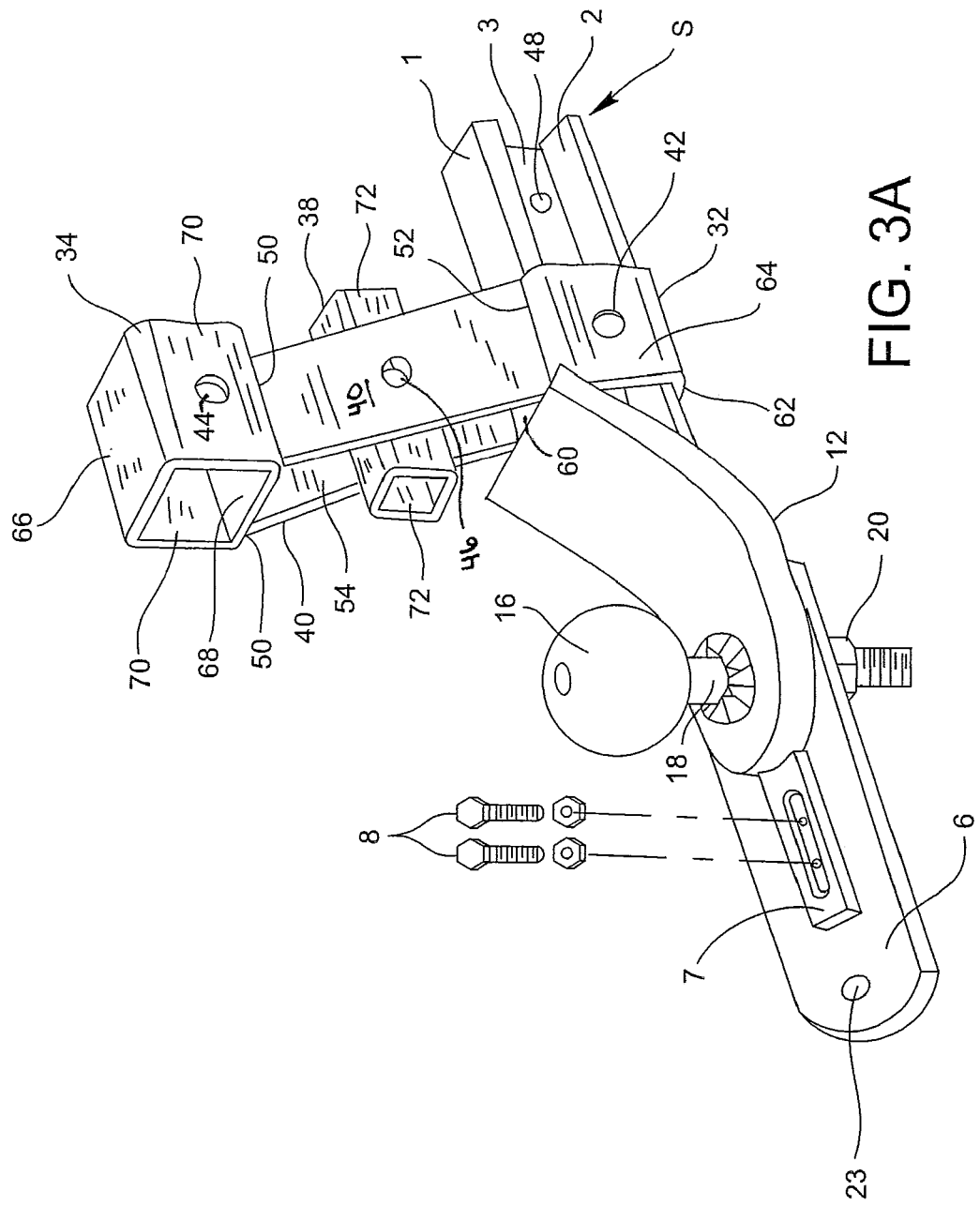
FIG. 3A is a rear perspective view of the invention of FIG. 1 as mounted on the inventive ball hitch mount.

Referring to FIGS. 2A and 3A, there is shown a side elevational view and a perspective view, respectively, of the embodiment of FIG. 1, wherein attachment assembly 30 has a lower receiver tube acting as lower collar 32 mounted on inventive hitch mount shank S, an upper receiver tube 34 and a central receiver tube 38 connected by receiver tube support members 40. Upper receiver tube 34, central receiver tube 38, and lower collar 32 are shown having pin bores 44, 46, and 42, respectively, for receiving hitch pins as desired. Inventive shank S is shown removed from the hitch receiver R and having hitch pin bore 48. Owing to the additional weight of the accessories to be supported, inventive shank S can be a heavier-duty shank than the standard tube shank but lighter than a solid steel shank. Shank S can be constructed of a heavy-duty 2 inch (5 cm) H-beam and includes upper flange 1, lower flange 2, and web 3.

As best seen in FIG. 2A, to provide a more secure ball connection and prevent potential ball spin resulting from ball nut 20 under torque, ball mount platform 12 has broached surfaces 4, e.g., on both the top and bottom surfaces where the hitch ball mounting surface makes contact with the ball mount platform. Inventive hitch ball 16 also has a corresponding broached surface 5 to interlock with broached surface 4 on ball mount platform 12. A broached surface on the trailer ball and ball mount extension may be provided in all of the embodiments of the multi-task trailer hitch assembly of the present invention described herein.

Also shown in FIG. 2A is a ball mount platform extension tab 6 (fastened to ball mount platform 12 with the trailer ball shank 18 passing through a bore hole in the forward section of the extension tab and secured with a ball nut 20) for attaching a shackle 9 when an unobstructed tow strap connection between tow vehicle and towed vehicle is desirable. Since the ball mount platform extension tab 6 has a throughbore at its rear end section, it can also be used when desirable to tow products containing a bifurcated trailer tongue by removing the shackle and inserting a clevis pin through the holes in the bifurcated trailer tongue and the hole in the ball mount platform extension tab. Ball mount platform extension tab 6 may also have a corresponding broached surface 5' to interlock with the broached surface 4 on the underneath side of ball mount platform 12.

In lieu of broached surface 5' on ball mount platform extension tab 6, the extension tab alternatively may include an adjustable tightening bar 7 secured in place by tightening bolts 8 inserted into threaded bore holes in extension tab 6, as best seen in FIG. 3A. Alternate tightening bar 7 has a square end on one end and a concave end on the other end. By removing bolts 8, the tightening bar can be rotated 180 degrees and either the square end or concave end used to abut the ball mount platform 12 or the like of corresponding shape. Once the ball mount platform extension tab 6 is attached to the ball mount platform 12 and hand tightened, tightening bar 7 is slid forward to make contact with the ball mount platform or the like; bolts 8 are then securely tightened to keep the extension tab 6 tightened securely against the ball mount platform 12 and the ball and nut tightened to proper torque. The tightening bar 7 prevents the ball mount platform extension tab 6 from potentially moving when torque is applied to the rear end portion of the ball mount platform extension tab 6.

Ball mount extension tab 6 may be completely flat as illustrated in FIGS. 2A and 3A or may alternatively include two symmetrical bends B', resulting in an offset or drop between the forward section attached to ball mount platform 12 and the rearward section containing shackle mount bore 23 as also shown in FIG. 3A.

Attachment assembly 30 may be permanently welded on shank S or mounted by sliding lower collar 32 over shank S as desired.

Figure 3B:
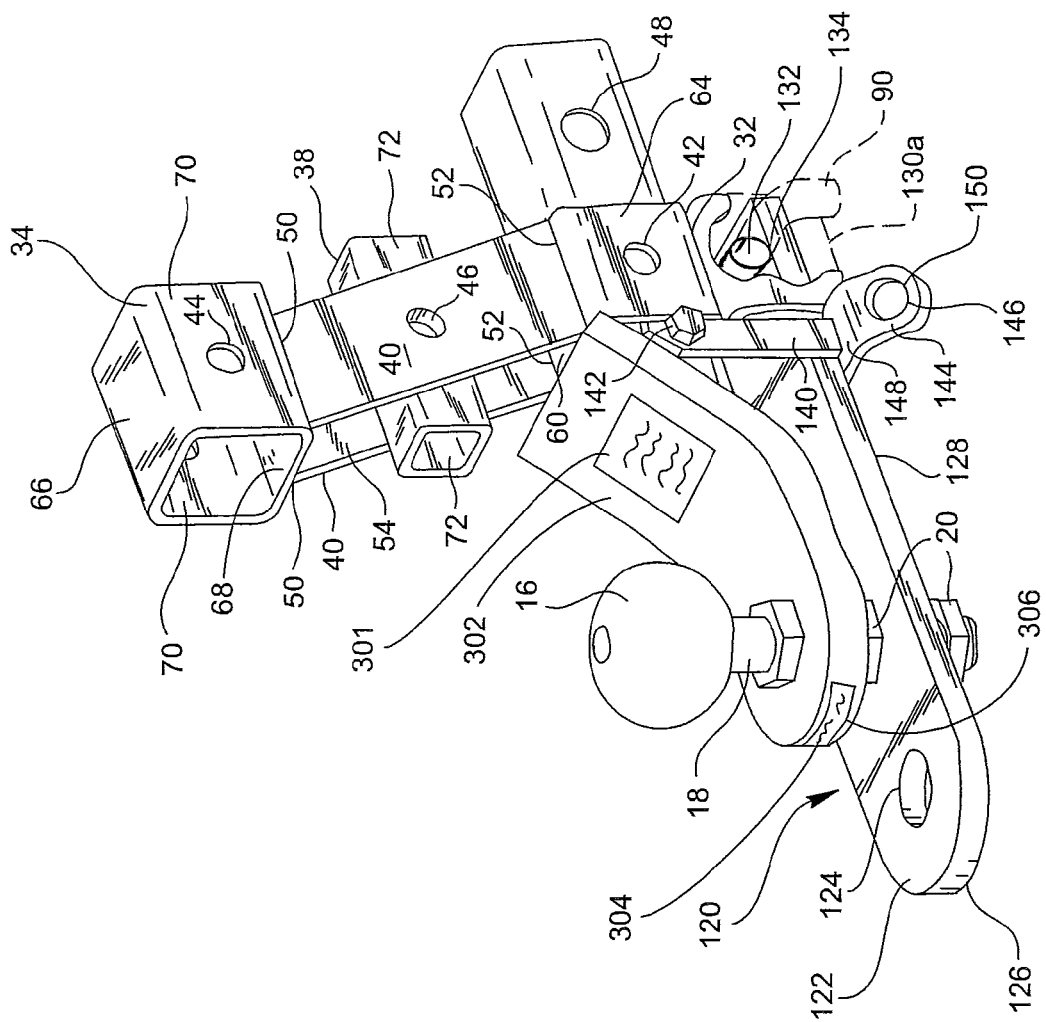
FIG. 3B is a rear perspective view of the invention as modified in FIG. 2B.
Figure 3C:
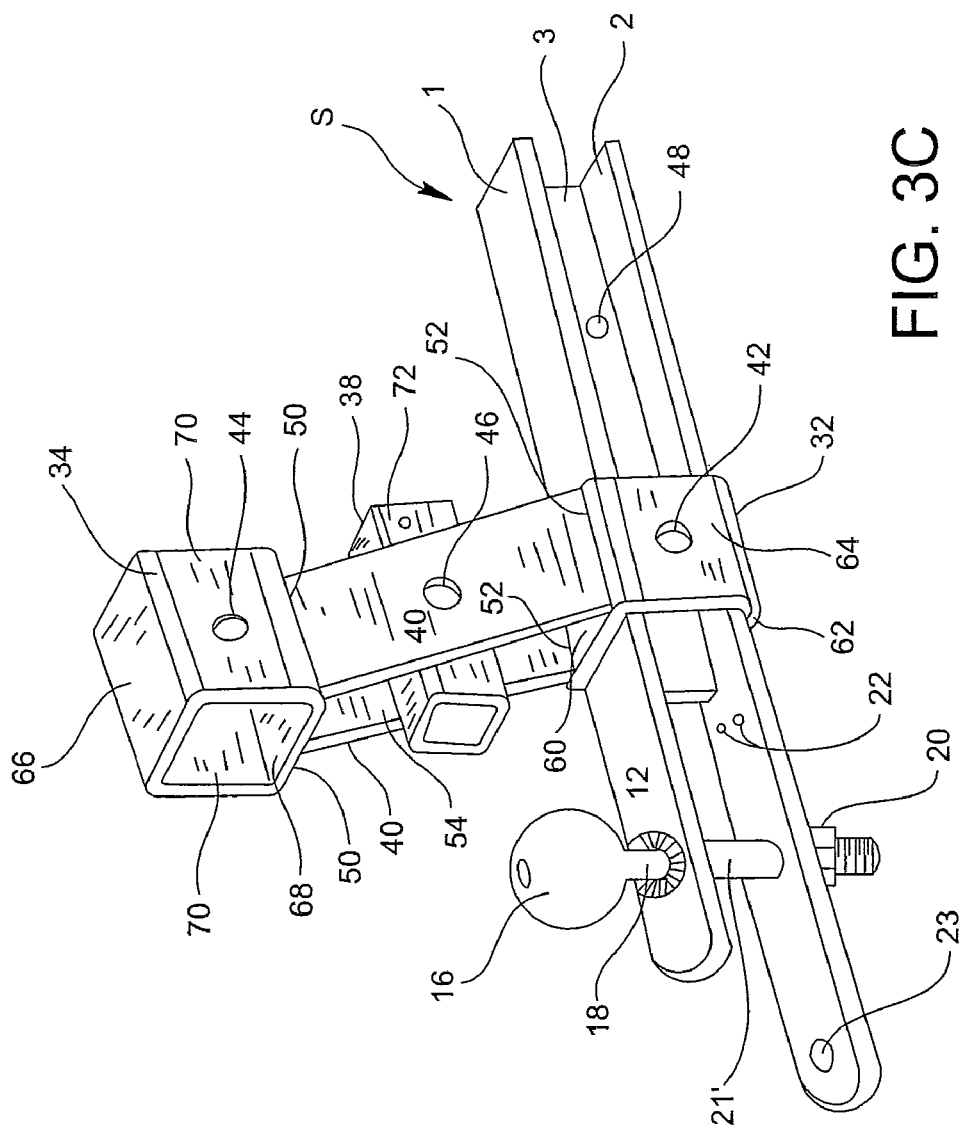
FIG. 3C is a rear perspective view of the invention of FIG. 2A modified to depict a ball mount platform having extended upper and lower shank flanges.
Figure 3D:
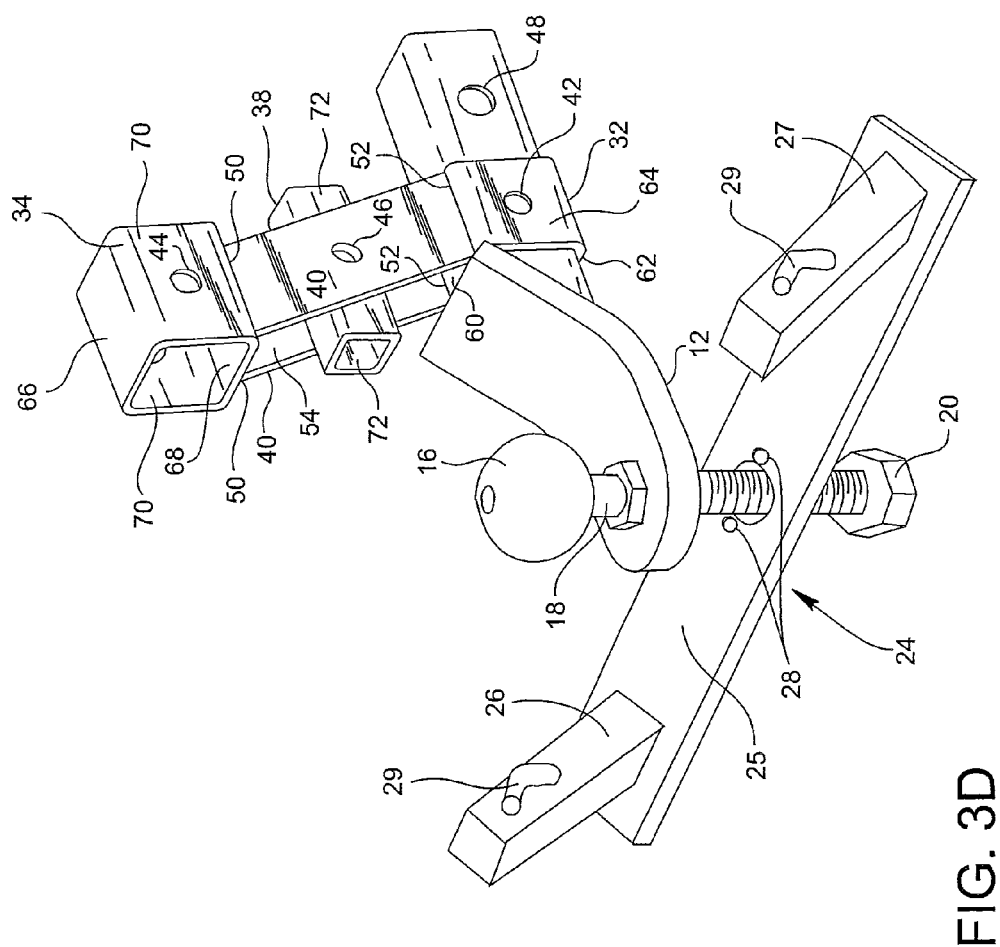
FIG. 3D is a rear perspective view of the invention of FIG. 2A further modified to depict an additional accessory mount.
Figure 3E:
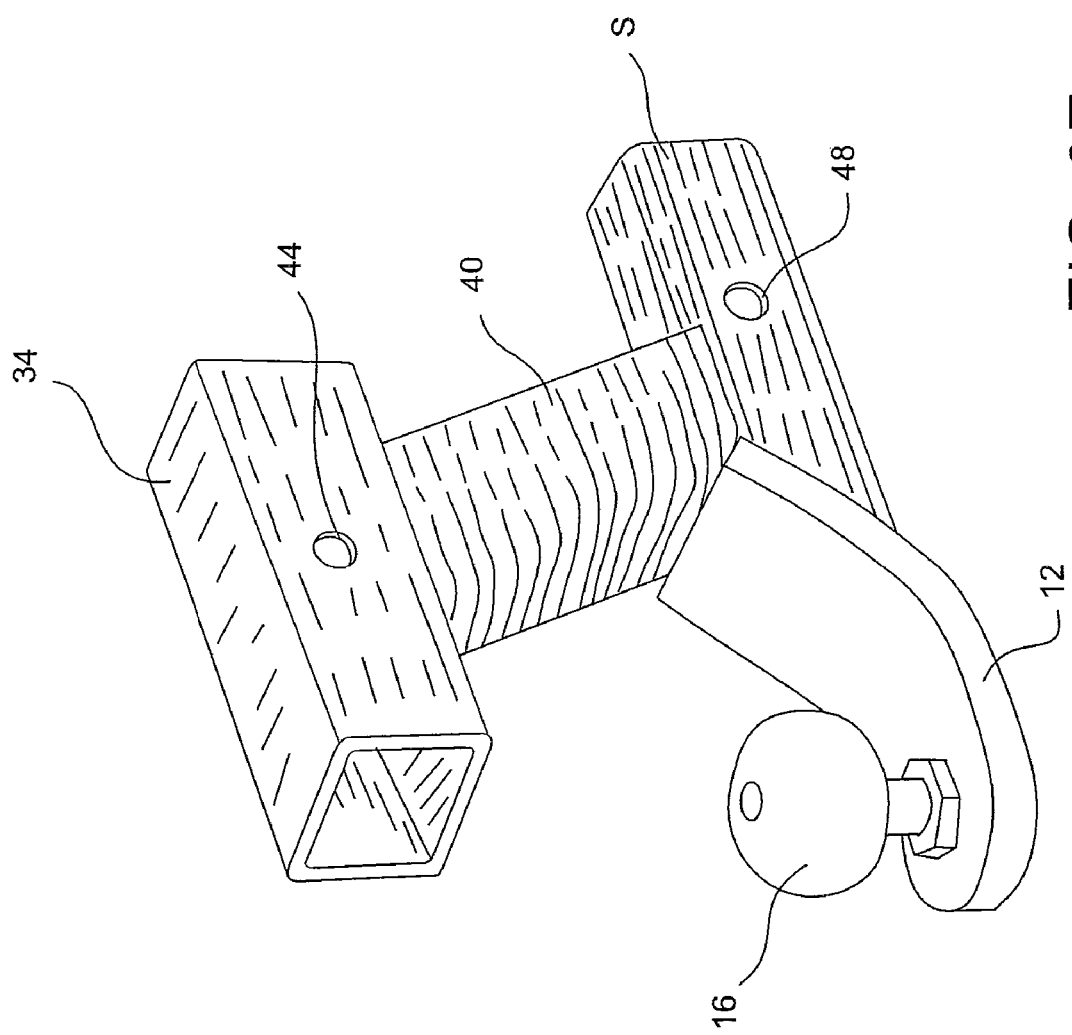
FIG. 3E is a perspective view of a hitch assembly incorporating features of the invention.

As shown in FIG. 3E, when attachment assembly 30 is permanently welded on shank S, shank collar 32 and central receiver tube 38 may be eliminated from the assembly and one square, or other appropriate shape, receiver tube support member 40 used in lieu of two receiver tube support members 40. Receiver tube support member 40 and shank S may be made of hollow tubing or solid steel.

In the embodiment illustrated in FIG. 3A, receiver tube support members 40 are attached to a lower wall 68 of upper receiver tube 34 by attachment thereto at receiver tube support member upper end portions 50 and to an upper wall 60 of lower collar 32 at receiver tube support member lower end portions 52. The central receiver tube 38 is attached to inner walls 54 of receiver tube support members 40, such as by welding. Lower collar 32 is square in cross section, having upper wall 60, lower wall 62, and side walls 64. Upper receiver tube 34 is square in cross section, having upper wall 66, lower wall 68, and side walls 70. Central receiver tube 38 is square in cross section, having side walls 72 connected to the inner sides 54 of receiver tube support members 40. As shown, the receiver tube assembly 30 is symmetrical and upper receiver tube 34 may be employed as the lower collar by inverting the receiver tube assembly 30. In addition, inventive hitch attachment assembly 30 can be rotated 180 degrees, resulting in support members 40 extending upwardly and forwardly from shank collar 32 or upwardly and rearwardly from shank collar 32 when also inverted.

Figure 2B:
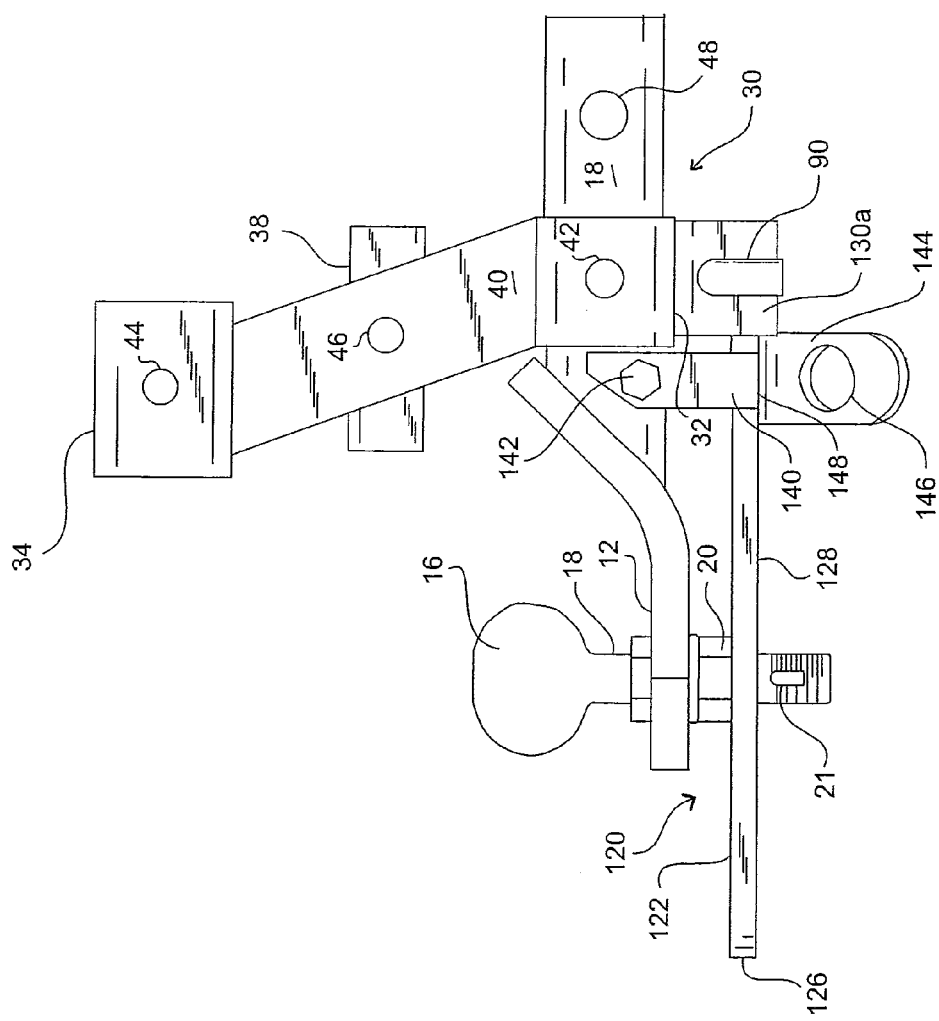
FIG. 2B is a side elevational view similar to FIG. 2A with a tongue-type attachment.

Referring to FIGS. 2B and 3B, there is shown a side elevational view and a perspective view, respectively, of the embodiment of FIG. 1 having a tongue-type hitch 120 mounted thereto. Tongue-type hitch 120 has a rear portion 122 having a vertical hitch pin receiving bore 124 therethrough. Tongue rear portion 122 has a rounded rear end 126. Hitch 120 has a forward portion 128 supported by tongue front support 130*a* attached to shank collar 32 of assembly 30 at its underside as by welding. Front support 130*a* is an inverted U-shaped member opening downward for access for installing the forward portion 128 of tongue-type hitch 120.

Tongue-type hitch 120 is attached at its rear by ball shank 18, ball mounting nut 20, and pin 21 (see FIG. 2B), or more solidly attached with ball mounting nuts 20 (see FIG. 3B) and at its forward portion to hitch pin receiver tube 132 receiving the shank of a hitch pin 90 extending through mounting bores in tongue front support 130*a*. Hitch pin receiver tube 132 is laterally mounted, e.g., such as by welding along its length, to the upper side of tongue forward portion 128 so as to align with throughbores in receiver tube attachment 134.

Forward portion 128 of tongue-type hitch 120 is removably secured to front support 130*a* by inserting the shank of hitch pin 90 through hitch pin receiver tube 132 (see FIG. 3B with front support 130*a* partially cut away). Tongue-type hitch 120, as installed, not only provides for the use of a hitch pin secured trailer tongue or the like but also prevents movement of shank collar 32 along shank S, providing additional stabilization of attachment support assembly 30.

Vertical guide bars 140 extend upwardly from each side of tongue forward portion 128 at a point rearward of front support 130*a* and are fastened at the upper end to hitch ball shank S by means of guide bar fastening bolt 142 extending through a throughbore (not shown) in hitch ball shank S and fastened by a nut (not shown). A pin clip or hitch pin of conventional design may be substituted for fastening bolt 142 as desired.

A lateral safety chain attachment bar 144 is attached, such as by welding, to the underside of tongue forward portion 128 so as to abut the rear end of tongue front support 130*a*. Safety chain attachment bar 144 has downwardly-angled end portions 146 extending from a center flat portion 148 attached to tongue forward portion 128. Angled end portions 146 define safety chain attachment bores 150 for attachment of trailer safety chains or the like. The lower ends of vertical guide bars 140 are attached to flat portion 148 of lateral safety chain attachment bar 144 and to the sides of tongue forward portion 128, as by welding. Vertical guide bars 140 add support for resisting any torque applied to tongue-type hitch 120 around ball shank 18.

Referring to FIG. 3C, there is shown a perspective view of an embodiment similar to that depicted in FIG. 3A with a modified inventive ball mount. Ball mount shank S is also constructed of a heavy-duty 2 inch (5 cm) H-beam and includes an upper flange 1, lower flange 2, and web 3. However, in this embodiment, the top flange 1 and lower flange 2 extend rearward of the web 3 and also serve as the ball mount platform 12. Ball shank 18 is inserted through bore hole in upper flange 1, through a steel spacer 21', through aligned borehole in lower flange 2, and tightened with ball nut 20. As illustrated, lower flange 2 extends rearward of upper flange 1 and, as shown in FIG. 3C, has an attachment element, such as a bore hole 23 for attaching a shackle 9 (see FIG. 2A) when an unobstructed tow strap connection between tow vehicle and towed vehicle is desirable or to tow products containing a bifurcated trailer tongue when desirable. Lower flange 2 also contains two symmetrical bore holes 22 rearward of the rear end of the web for attaching an additional receiver tube assembly as shown in FIG. 3D.

Referring to FIG. 3D, there is shown a perspective view of an embodiment also similar to that depicted in FIG. 3A but with an additional dual-receiver tube assembly 24 to provide an even more versatile multi-task trailer hitch assembly. Inventive dual-receiver tube assembly 24 includes cross member 25 and left and right receiver tubes 26 and 27, respectively. Cross member 25 may be made of any desired material, such as flat steel, angle iron, tubing or the like, and has a center hole for bolting to the ball mount platform with the threaded trailer ball shank 18 and nut 20. Cross member 25 also has two symmetrical bore holes 28 for optional mounting on the lower flange of the embodiment shown in FIG. 3C by aligning holes 28 in cross member with holes 22 in lower flange and securing with two bolts, lock washers, and nuts (not shown), as opposed to mounting with the trailer ball shank 18 and nut 20. The right and left end portions of cross bar is shown with auxiliary receiver tubes 26 and 27 attached, such as by welding, and rising in an upward and rearward angled position, providing a dual receiver assembly particularly useful for receiving dual support/mounting legs from a universal accessory support base and/or other ATV or lawn and garden tractor accessories, and is easily attached and detached with hitch pins 29. Alternatively, accessory support legs can be permanently welded to cross bar 25, eliminating the need for receiver tubes 26 and 27. Ball mount platform extension tab 6 (FIGS. 2A and 3A) may be used separately in conjunction with cross member 25 or welded to cross bar 25 and made a permanent feature of cross bar 25. Cross member 25 may also be permanently welded to lower flange 2 or ball mount platform 12 if so desired, negating the bolt-on attaching method.

Figure 4:
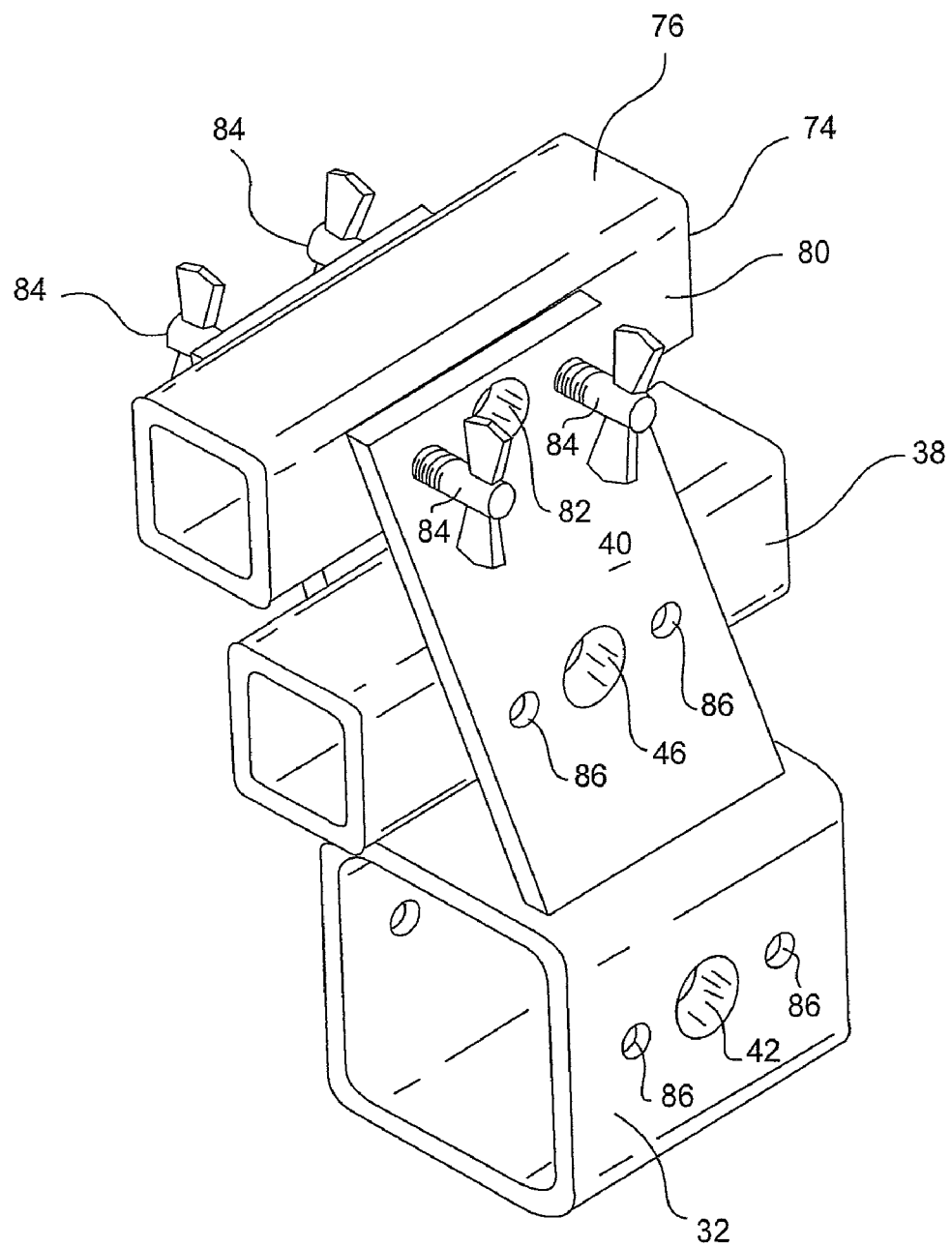
FIG. 4 is a rear perspective view of another embodiment of the invention of FIG. 1.

Referring to FIG. 4, there is shown a perspective view of an attachment assembly similar to that of FIG. 3A. In this embodiment a Class II size (1 ¼ inch/3.2 cm) receiver tube 74 is substituted for the Class III size (2 inch/5 cm) upper receiver tube 34 and mounted between the side walls of receiver tube support members 40 in like manner as central receiver tube 38. In this embodiment, the attachment assembly as shown has a Class III (2 inch/5 cm) lower collar. The attachment assembly of this embodiment may be inverted to fit over a Class II (1¼ inch/3.2 cm) ball mount shank. Thumbscrews 84 are shown in threaded bores 86 for fastening an attachment shank within the tube receivers. Such thumbscrews 84 and threaded bores 86 may be provided in all of the embodiments of the multi-task trailer hitch assembly of the present invention described herein.

Figure 5:
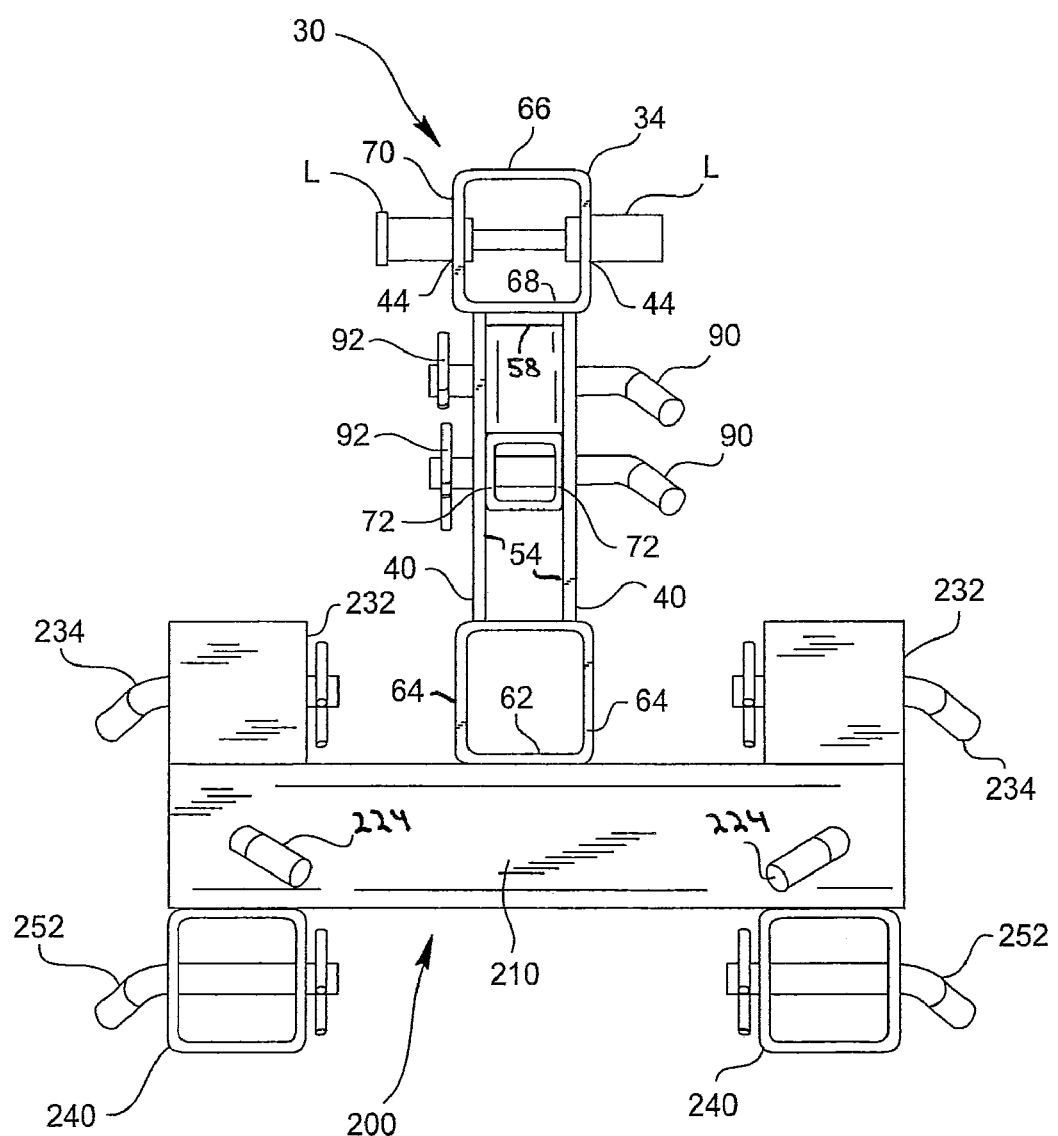
FIG. 5 is a rear elevational view of still another embodiment of the invention of FIG. 1.
Figure 6:
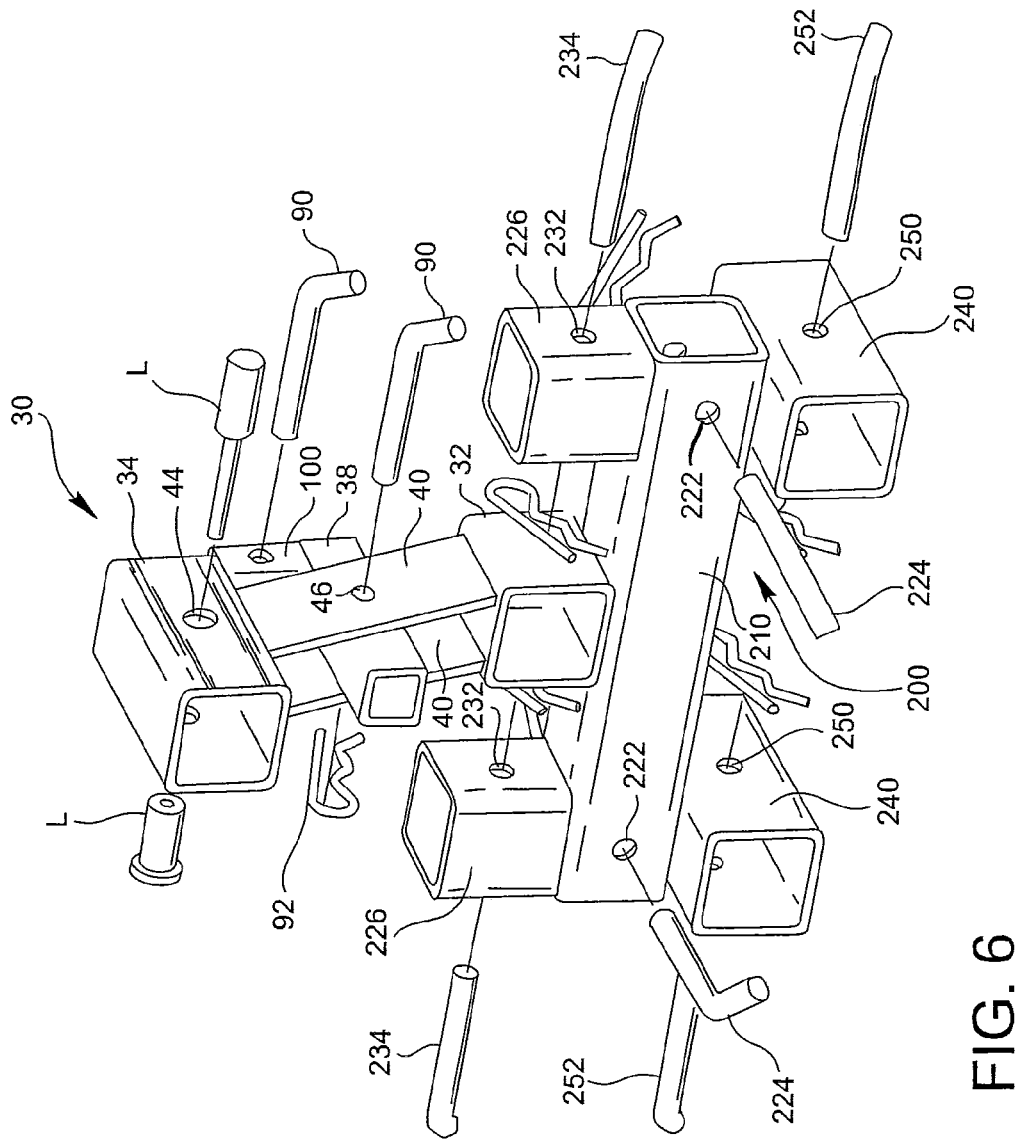
FIG. 6 is a rear perspective view of the embodiment of the invention of FIG. 5.
Figure 7:
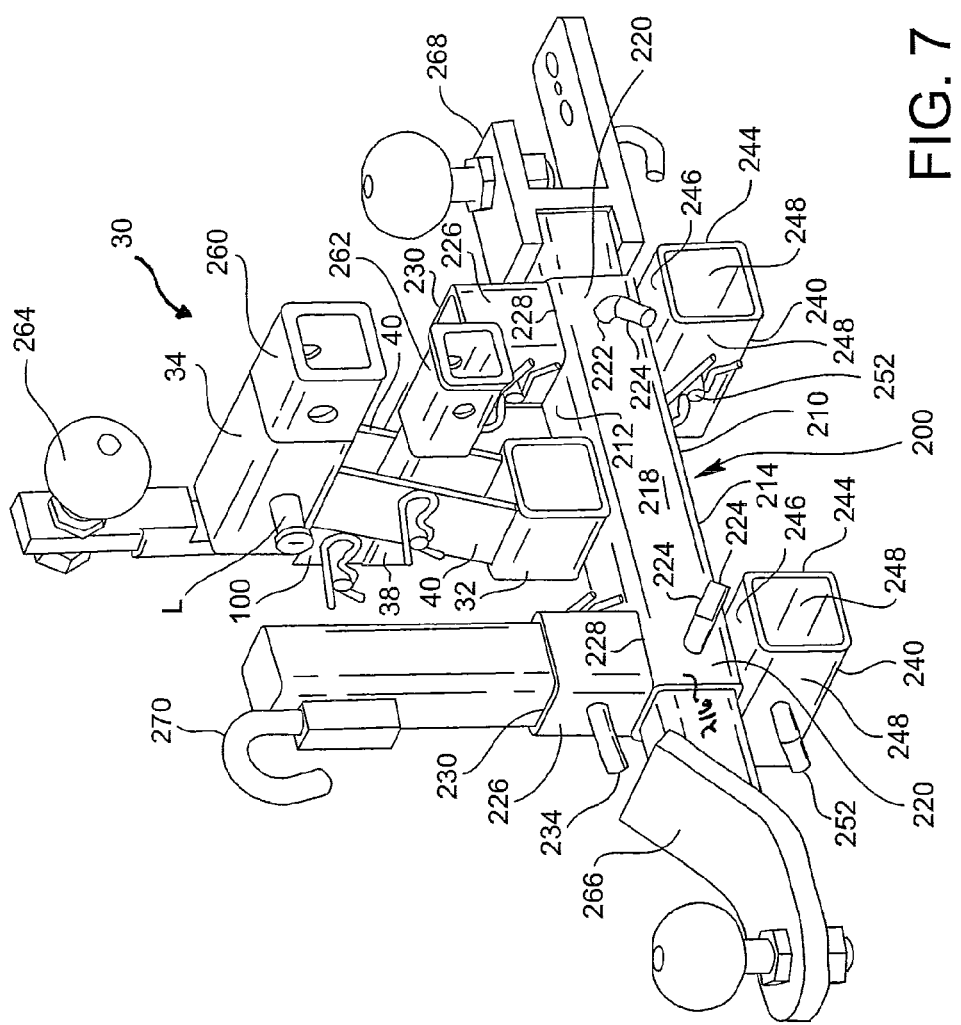
FIG. 7 is a partially exploded view of the embodiment of the invention of FIG. 5.

Referring to FIGS. 5, 6, and 7, there is shown a rear elevational view, a partially exploded view, and a perspective view, respectively, of another embodiment of the multi-task trailer hitch assembly of the present invention referred to by reference number 200. Attachment assembly 200 includes the embodiments of the attachment assembly 30 as described above having additional structure attached thereto, such as by welding. Cross bar tube and attachment receiver tube 210 is attached at a center portion 218 of the upper wall 212 to the underside of and perpendicular to collar 32.

In the illustrated embodiment, cross bar tube 210 is square in cross section and has an upper wall 212, a lower wall 214, and side walls 216 and has end portions 220 at points spaced substantially equal from center portion 218. Cross bar end portions have cross bar hitch pin bores 222 and hitch pins 224 for receiving and securing spare hitch mounts, such as spare ball hitch 266 and combination ball and tongue hitch 268 (see FIG. 7). Upward opening attachment receiver tubes 226 are attached to cross bar 210 at their lower ends 228 to end portions 220 on the upper wall 212 and having upper opening mouths 230 for receiving vertically-stored hitch accessories, such as hook hitch 270. Receiver tubes 226 are shown having hitch pin bores 232 and hitch pins 234 for securing hitch attachments and spares within receiver tubes 226. Rearward-opening attachment receiver tubes 240 are square in cross section and each have a rearward-opening mouth 244, an upper wall 246, and side walls 248 having hitch pin bores 250 therein and hitch pins 252 for securing hitch attachments and spares therein. Receiver tubes 240 are attached to cross bar 210 at their upper walls 246 to end portions 220 of cross bar 210 on lower wall 214, such as by welding.

Referring to FIG. 7, there is shown an additional upward-opening receiver tube 100 mounted on the front upper wall of central receiver tube 38 and extending upwardly therefrom for engaging an accessory (not shown) or carrying an additional hitch ball mount 264 or the like. Lock-type hitch pin L is shown mounted on upper receiver tube 34. Hitch pins 90 having cotter pins 92 are shown inserted through bores, such as bores 46, of central receiving tube 38. As further shown in FIG. 7, a 1¼ inch (3.2 cm) to 2 inch (5 cm) adapter 262 is stored in central receiving tube 38. A 2 inch (5 cm) receiver extender 260 is mounted in upper receiver tube 34.

Figure 8:
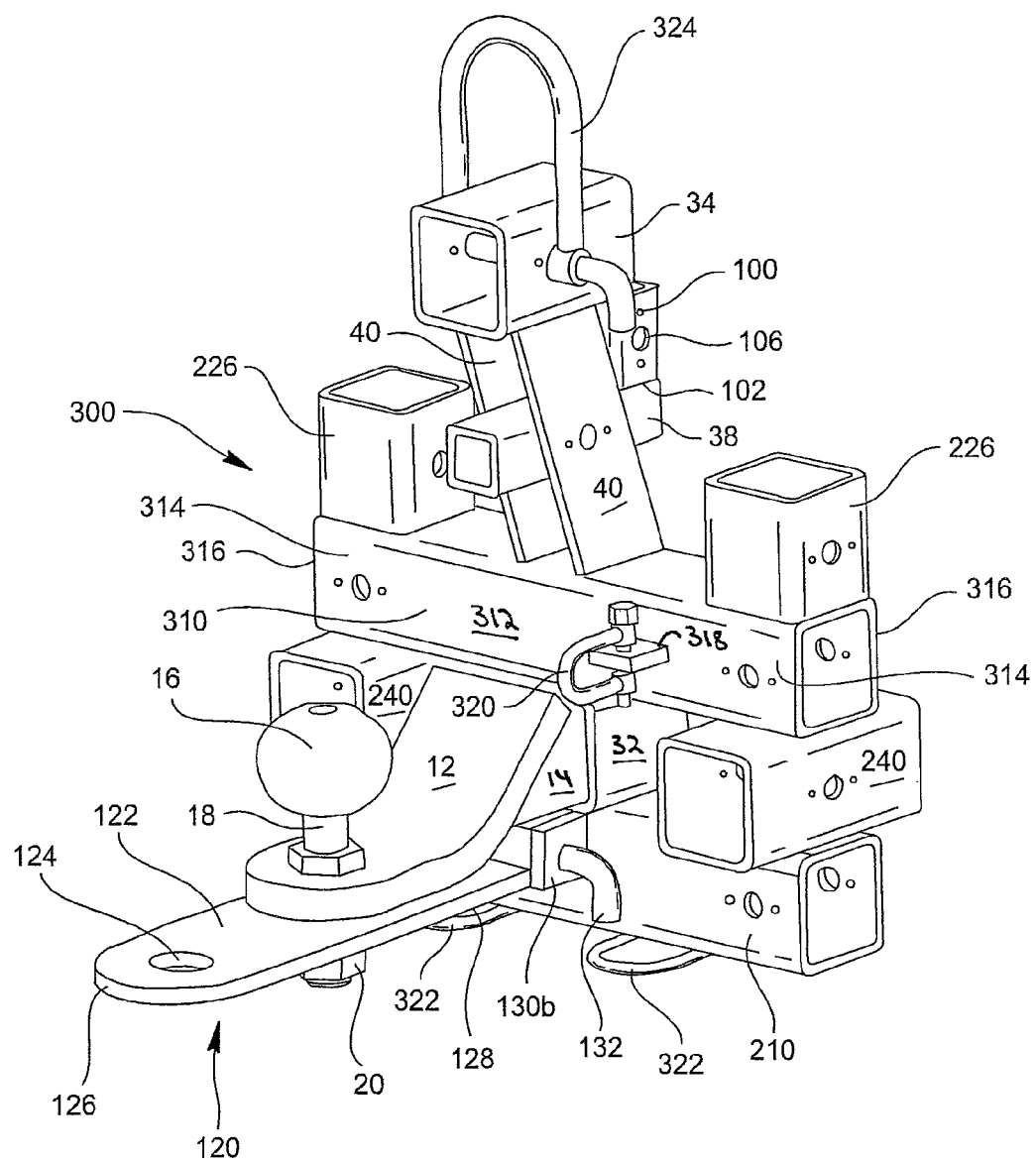
FIG. 8 is a rear perspective view of yet another embodiment of the invention of FIG. 1.

Referring to FIG. 8, there is shown a rear perspective view of another embodiment of the multi-task trailer hitch assembly of the present invention referred to by reference number 300. Attachment assembly 300 includes elements of the embodiments of the attachment assembly 200 as described above having additional structure attached thereto, such as by welding. Attachment assembly 300 includes shank collar 32, upper attachment receiver tube 34, central receiver tube 38, and receiver tube support members 40 having upper cross bar 310 located between shank collar 32 and receiver tube support members 40.

In the illustrated embodiment, upper cross bar and attachment receiver tube 310 is tubular, having a square cross section, and co-extends with cross bar and attachment receiver tube 210. Receiver tube 310 has a central portion 312 and end portions 314 forming end portion attachment receiving mouths 316. The central portion 312 of cross bar 310 is attached to the upper side of collar 32, such as by welding. Upward opening attachment receiver tubes 226 are attached to the respective end portions of upper cross bar 310 in a manner similar to their attachment to cross bar and attachment receiver tube 210 in the embodiment 200 described above.

Rearward opening receiver tubes 240 are attached between upper cross bar 310 and lower cross bar 210 (see description of the embodiment 200 described above and shown in FIG. 7). Spaced hitch safety chain attachments 322 are attached, such as by welding, along the lower wall of cross bar 210, chain attachment 322 also being useful for attaching tow ropes. A shackle mounting plate 318 is attached, such as by welding, to a location along the rear side wall of upper cross bar 310 so as to support shackle 320 for use in towing by rope or the like. The spaced hitch safety chain attachments 322 and shackle 320 may be similarly attached to cross bar 210 of the embodiment of FIG. 7, as desired. Upward opening receiver tube 100 is shown attached to the upper wall of receiver tube 38 at the forward end thereof at connection 102. Upward opening receiver tube 100 is shown having hitch pin bores 106 in opposed side walls. Carrying handle 324 is attached to upper attachment receiver tube 34 by a hitch pin or the like to carry hitch receiver tube assembly 300 when not in use. Handle 324 may also be rotated forward to receive a shackle or tow hook for towing. A carrying handle 324 may be similarly attached to any of the embodiments of the present invention described herein.

Tongue-type hitch 120 is shown attached to the shank 14 in a similar manner to that shown in FIG. 3B, with the exception that tongue front support 130b is attached to the front side wall of cross member 210, tongue front support 130b supporting tongue forward portion 128 by means of hitch pin receiver tube 132 (see description above regarding the embodiment of FIG. 3B). The feature of the upward opening attachment receiver tube 100 may also be included in the embodiments of FIGS. 1-4, above.

Figure 9A:
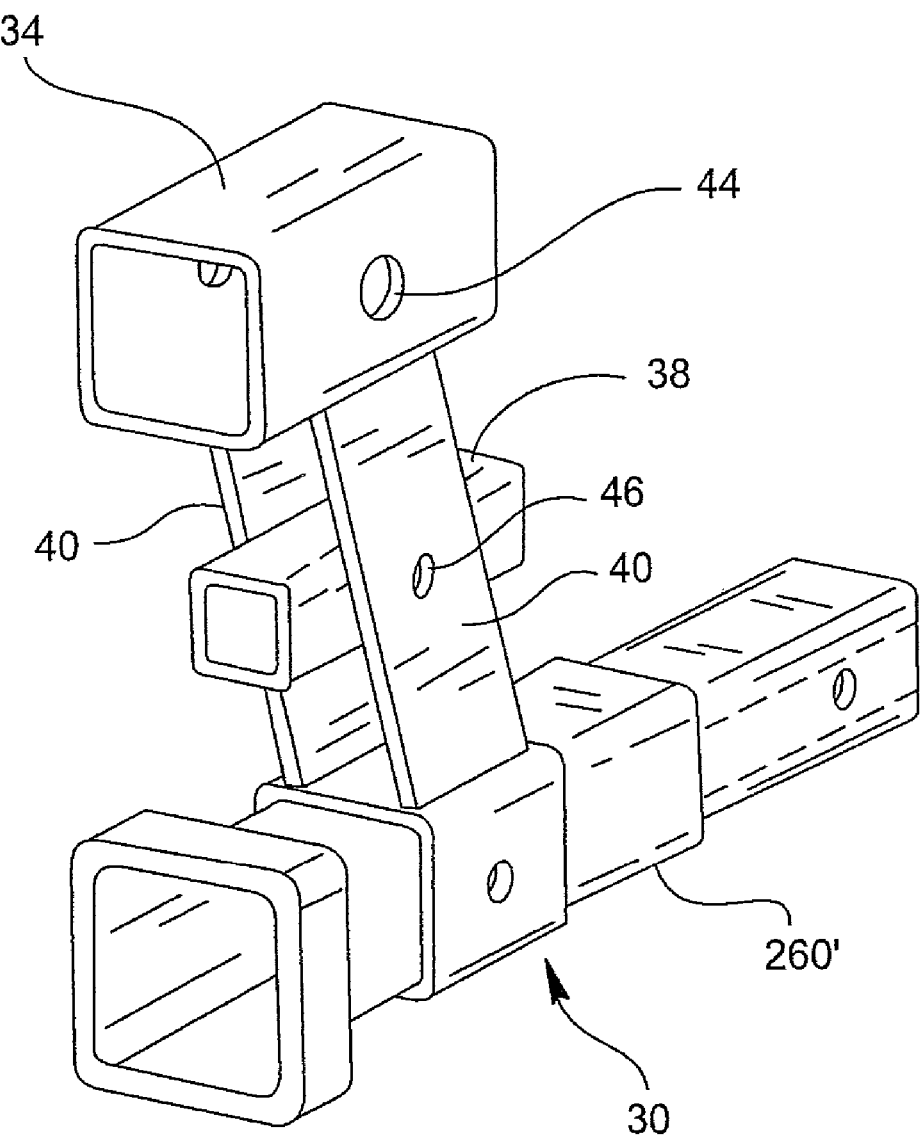
FIG. 9A is a perspective view of yet another embodiment of the invention of FIG. 1 as mounted on a receiver/ball mount extension/reducer/adapter.
Figure 9B:
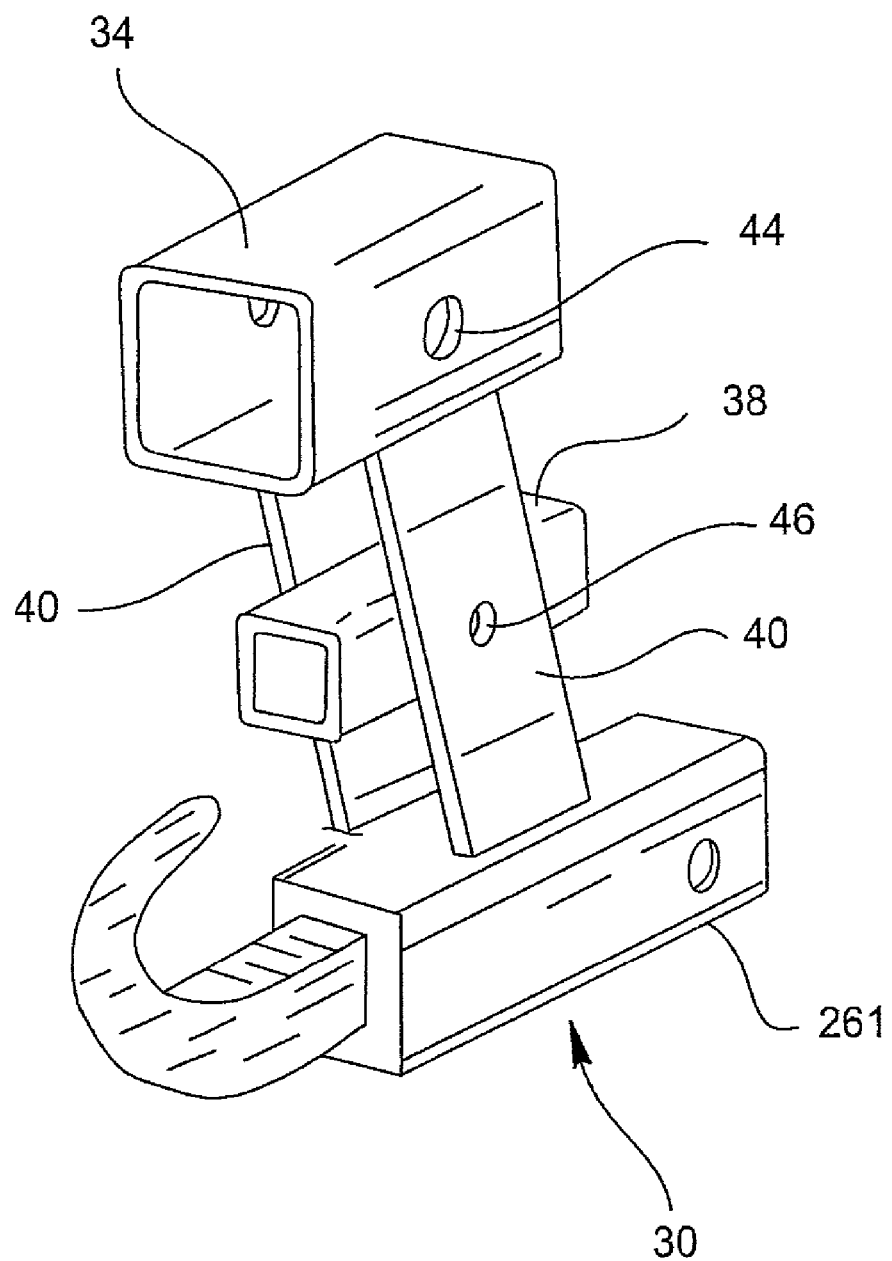
FIG. 9B is a perspective view of yet another embodiment of the invention of FIG. 1 as mounted on a hitch accessory other than a ball mount or ball mount extension.

Referring to FIG. 9A, there is shown a perspective view of another embodiment of FIG. 1, similar to that of FIG. 3A. By modifying the size of lower collar 32, attachment assembly 30 is mounted on a receiver/ball mount extension/adapter/reducer 260'. The use of these accessories, however, reduces the load rating of the hitch up to as much as 50% and, thus, is particularly useful for light duty applications.

Carrying handle 324 is attached to upper attachment receiver tube 34 by a hitch pin or the like to carry hitch receiver tube assembly 300 when not in use. Handle 324 may also be rotated forward to receive a shackle or tow hook for towing. A carrying handle 324 may be similarly attached to any of the embodiments of the present invention described herein.

The tube receiver assemblies as described above may be mounted directly to the ball mount shank S or receiver/ball mount extension 260' by welding, negating the need of a shank collar 32.

Figure 10:
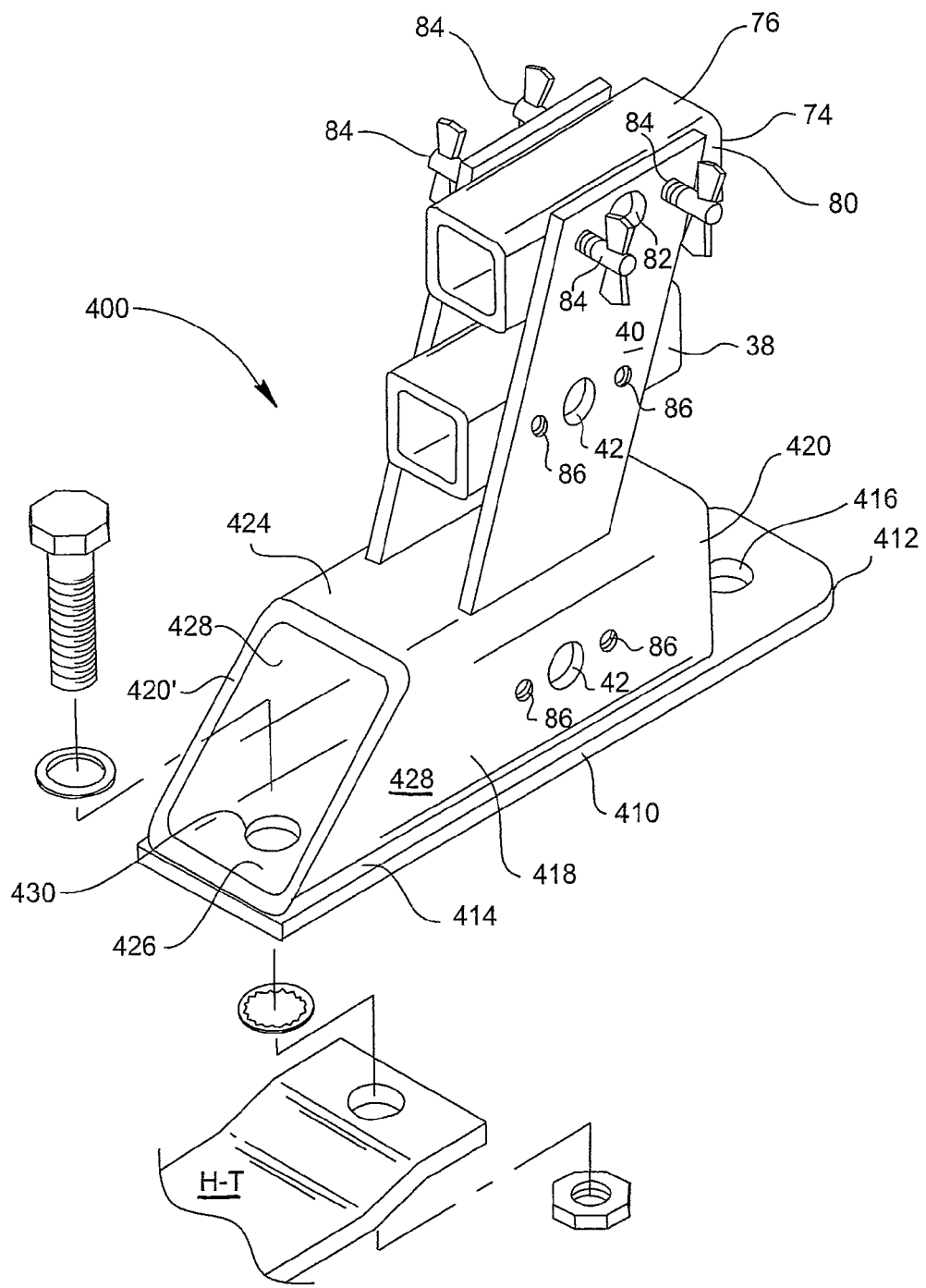
FIG. 10 is a partially exploded perspective view of another embodiment of the invention providing receiver tubes on an extension for mounting on a tongue-type hitch ball mount.

Referring to FIG. 10, there is shown a perspective view of another embodiment of the accessory receiver system of the present invention useful with pulling vehicles having tongue-type hitches. Hitch tongue extender system 400 includes a hitch tongue extender bar 410 having a rear end portion 412 and a forward end portion 414, forward end portion 414 having a hitch tongue connecting bore 430 for connection to hitch tongue H-T by a bolt, star washer, split lock washer and nut, or the like. A section of hitch receiver tube 418 is mounted on hitch tongue extender bar 410, which, in turn, supports an assembly of receiver tubes, such as that of FIG. 4, as shown, or that of FIGS. 1-3A as described above. Hitch receiver tube 418 has a vertically-cut rear end portion 420 and a downward-sloping forward end portion 420'. Hitch receiver tube 418 has an upper wall 424 supporting the receiver tube assembly, a lower wall 426, and side walls 428. Rear end portion of hitch tongue extender bar 410 has a rounded rear end 412 and a hitch ball or pin receiver bore 416 extends through extender bar rear end portion 412 at a point spaced rearward of the respective rear ends of hitch receiver tube 418 and hitch tongue extender bar 410 for mounting a hitch ball or receiving a hitch pin. The receiver tube assembly is mounted so as to angle rearward rather than to the front, however, this is merely a matter of choice depending on available space in the vicinity of the hitch tongue H-T. Alternatively, in lieu of mounting a hitch ball in bore 416, a separate ball mount may be inserted in receiver tube 418.

Figure 11:
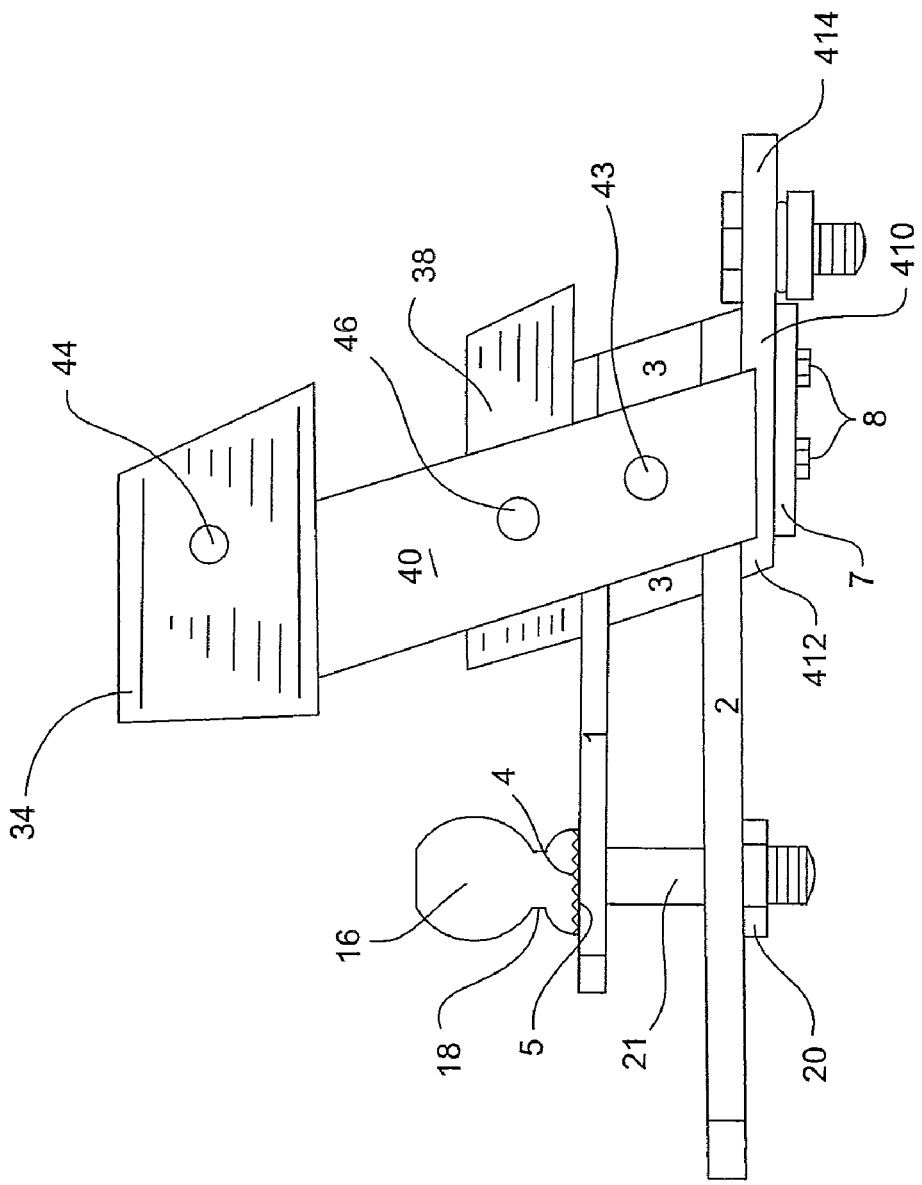
FIG. 11 is a side elevational view of another embodiment of the multi-task trailer hitch assembly providing receiver cavities and the inventive ball mount on an extension for mounting on a tongue-type hitch bar or lawn and garden tractor or other vehicle lacking a receiver-type hitch.
Figure 12:
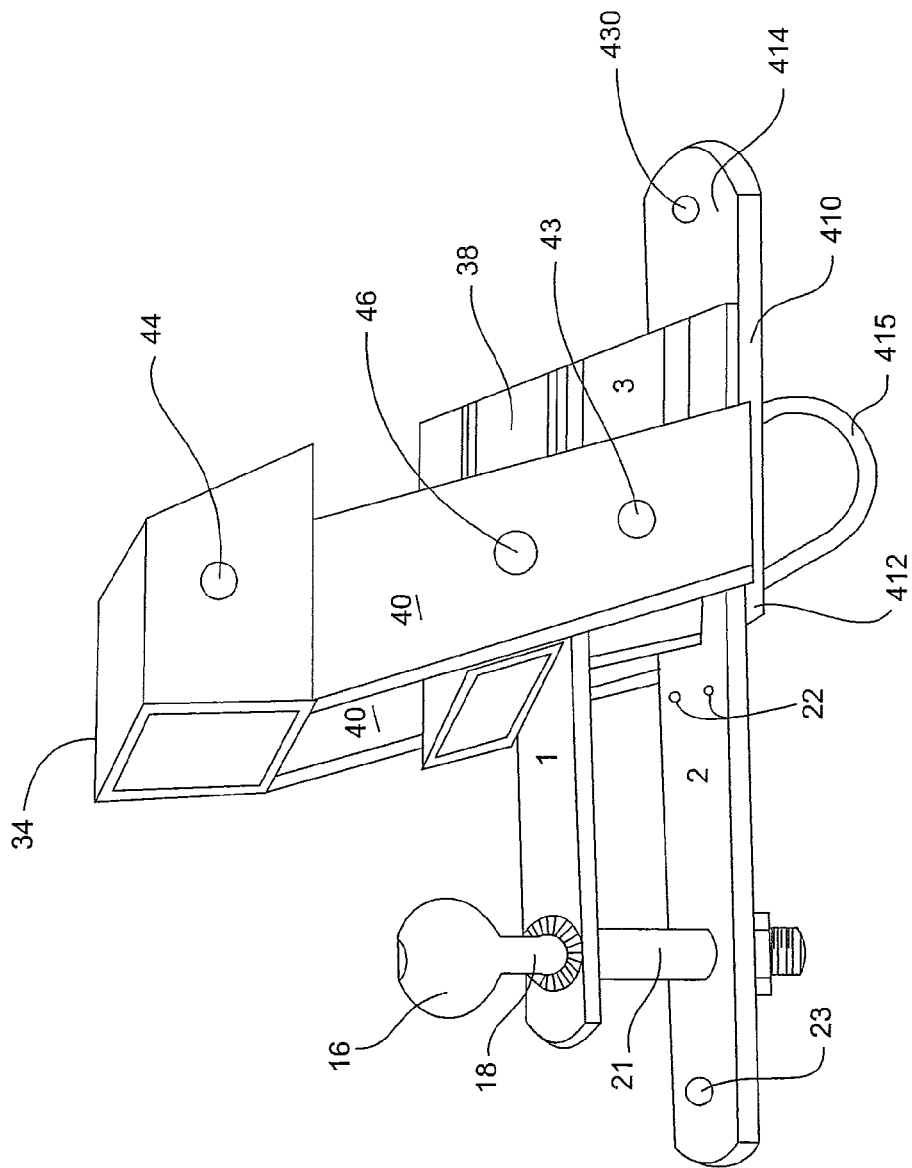
FIG. 12 is a partially exploded perspective view of the multi-task trailer hitch assembly of FIG. 11.

Referring to FIGS. 11 and 12, there is shown a side elevational view and partially exploded perspective view, respectively, of another embodiment similar to the embodiment shown in FIG. 10 and useful with pulling vehicles having tongue-type hitches.

Like the embodiment shown in FIG. 10, the embodiment shown in FIGS. 11 and 12 has a hitch tongue extender bar 410 having a rear end portion 412 and a forward end portion 414, forward end portion 414 having a hitch tongue connecting bore 430 for connection to a vehicle's hitch bar with a bolt, split lock washer and nut, or the like. Upright receiver tube support members 40 are attached to the rear end portion 412 of hitch tongue extender bar 410 and supports an assembly of receiver tubes, such as that of FIG. 4 or that of FIGS. 1-3A, as shown, and as described above. On its underneath side, hitch extender bar 410 contains an adjustable tightening bar 7 secured in place by tightening bolts 8 inserted into threaded bore holes in hitch tongue extender bar 410. Tightening bar 7 has a square end on one end and a concave end on the other end. By removing bolts 8, the tightening bar 7 can be rotated 180 degrees and either the square end or concave end used to abut the vehicle's hitch bar of corresponding shape. Once the hitch assembly is attached to the vehicle's hitch bar and hand tightened, tightening bar 7 is slid forward to make contact with the vehicle's hitch bar; bolts 8 are then securely tightened to keep the hitch assembly tightened securely against the vehicle's hitch bar and the mounting bolt and nut tightened to proper torque. The tightening bar 7 prevents the hitch assembly from potentially moving when torque is applied to the rear end portion of the ball mount. As seen in FIG. 12, opposing hitch safety chain loops 415 are attached, such as by welding, to the bottom of tongue extender bar 410, safety chain loops 415 also being useful for attaching tow ropes, tie-downs, and bungee cords. Except being of shorter length, the ball mount illustrated in this embodiment is identical to the ball mount shown in FIG. 3C, including corresponding broached surfaces 4 and 5 on both the ball and ball mount platform (upper flange 1). When fully inserted into its receiver cavity, lower flange 2 on ball mount abuts the head of the hitch assembly mounting bolt.

A much more desirable and convenient method of attaching accessories to a vehicle, such as an ATV, is achieved via a trailer hitch mount without sacrificing towing capability with the inventive multi-task trailer hitch assembly described herein. Unlike many ATV accessories whose use is limited to a specific ATV make and model, this multi-task trailer hitch assembly invention can be used on any ATV make or model that has a hitch receiver or hitch bar.

Figure 13:
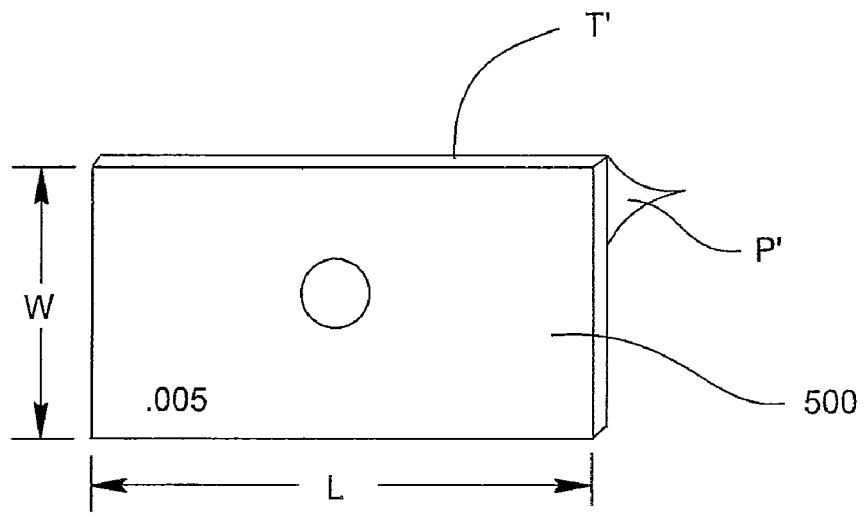
FIG. 13 is a side elevational view of inventive shank expander strips applicable to all embodiments of this multi-task trailer hitch assembly.

Referring to FIG. 13, there is shown a side elevational view of inventive and conjunctive shank expander strips applicable to all embodiments of this multi-task trailer hitch assembly. Shank expander strips 500 are thin strips of steel approximately 5 inches in length l with a width W slightly smaller than shank size (e.g., $15/16$ inch (2.4 cm) for use on a standard 1 inch (2.54 cm) shank, $13/16$ inches (3 cm) for use on a standard $1\frac{1}{4}$ inches (3.2 cm) shank, and $1^{15}/16$ inches (4.9 cm) for use on a standard 2 inch (5 cm) shank. Shank expander strips vary in thickness T' beginning with a strip 0.005 inch (0.01 cm) and increasing by multiples of 0.005 inch (0.01 cm) up to a strip 0.050 inch (0.13 cm) thick. The shank expander strips can have a self-adhesive backing covered with backing paper P' for attaching expander strips to top, bottom, and sides of ball mount or accessory shank when outside shank dimension expansion is necessary to achieve a firm connection in receiver tube. Each shank expander strip has a center bore for aligning with throughbore in ball mount shank, enabling hitch pin to pass through receiver tube, shank expander strips, and ball mount shank without obstruction when fastening ball mount to receiver.

Figure 14:
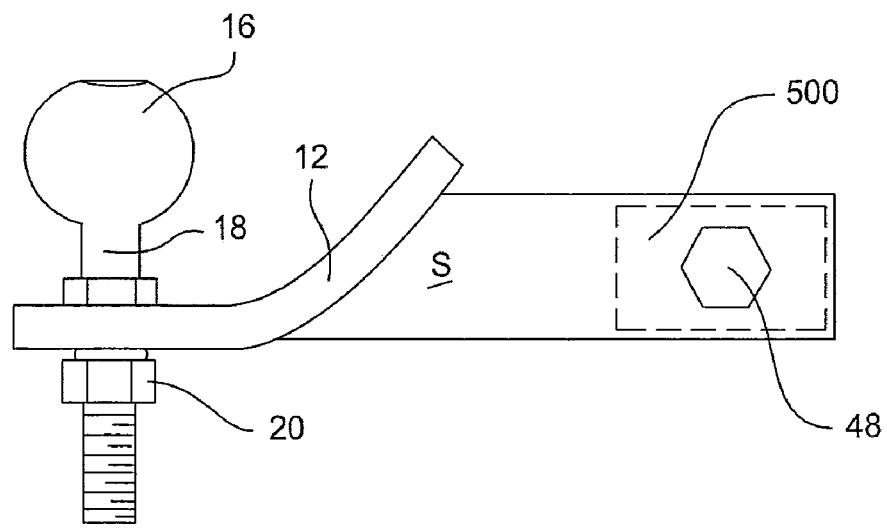
FIG. 14 is a side elevational view of shank expander strips installed on ball mount shank.

Referring to FIG. 14, there is shown a side elevational view of shank expander strip 500 installed on one side of standard 2 inch (5 cm) ball mount shank S. To determine the thickness of shank expansion strips to be used, ball mount shank S should be inserted into receiver tube and a measurement taken (using expander strips or feeler gauge) of the space between the top of the ball mount shank and top inside wall of receiver tube, noting the results of the measurement. To ensure proper bore hole alignment for inserting hitch pin when fastening ball mount to hitch, shank expander strips equal to or slightly small than half the size of the measurement noted can be installed on the top and bottom of ball mount shank by removing backing paper P' (FIG. 13) from expander strip and applying shank expander strips to ball mount shank.

Similarly, to determine the thickness of shank expansion strips to be used on the side(s) of ball mount shank S, the ball mount can be inserted into receiver tube and moved to one side with a measurement taken (using expander strips or feeler gauge) of the space between the side of the ball mount shank and side inside wall of receiver tube, noting the results of the measurement. A shank expander strip equal to or slightly smaller than the size of the measurement noted can be installed on one side of the ball mount shank by removing backing paper P' (FIG. 13) from expander strip and applying strip to side of ball mount shank. Alternatively, two shank expander strips equal to or slightly smaller than half the size of the measurement noted could be installed by attaching one expander strip to each side of the ball mount shank by removing backing paper P' (FIG. 13) from expander strip and applying strips to ball mount shank.

Figure 15:
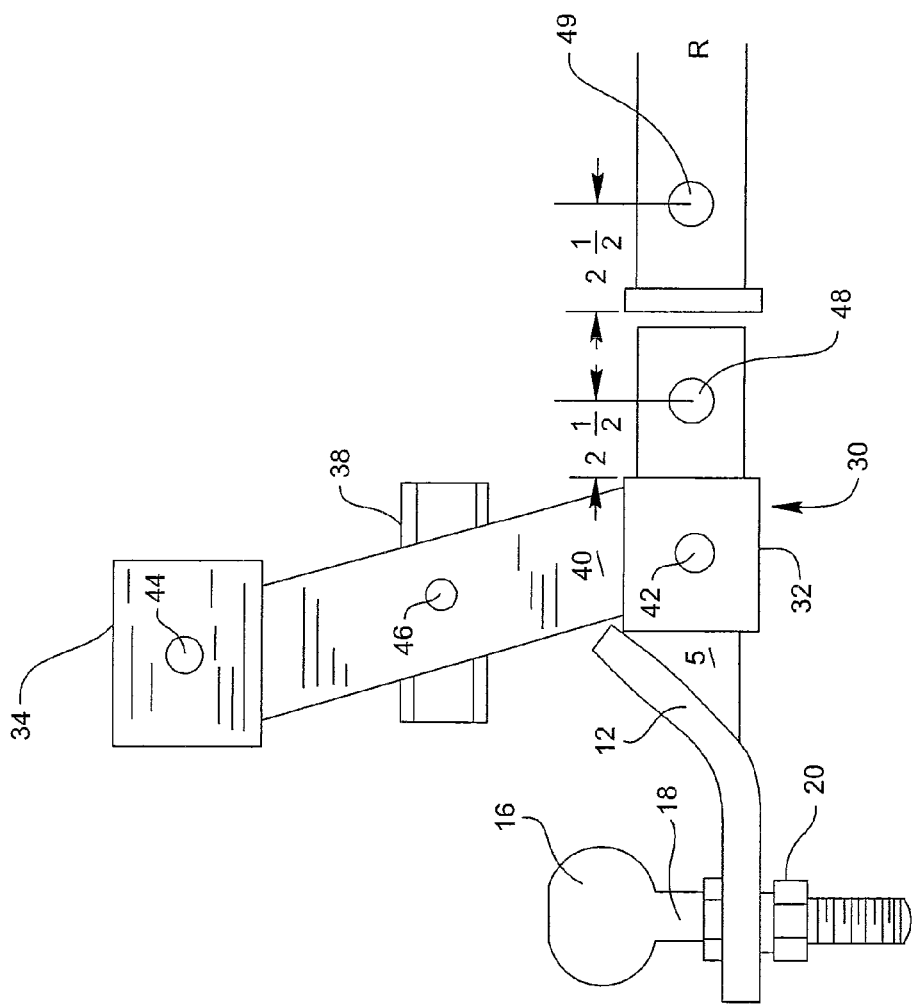
FIG. 15 is a side view of a hitch assembly.

Referring to FIG. 15, as a matter of standardization, a hitch pin bore 49 on a conventional 2 inch (5 cm) receiver tube R is customarily located 2½ inches (6.35 cm) forward of the face of the receiver tube to the center of the hitch pin bore. Based upon this standard feature, to permit coupling a ball mount or other accessory shank to the hitch receiver tube with a hitch pin and clip, the hitch pin bore 48 in standard 2 inch (5 cm) ball mounts, drawbars and other accessory shanks is positioned forward on the implement's shank a minimum distance of 2½ inches (6.35 cm) from any surface (weld, stop block, ball mount platform, etc.) that contacts the face of the receiver tube (shank contact surface) to enable the shank to be inserted far enough into the receiver to align the holes of both the receiver and accessory shank for inserting the pin.

By placing the hitch pin bore on the receiver of select tow vehicles at the inventive distance of less than 2½ inches (6.35 cm) from the center of the bore to the face of the receiver (e.g., 1½ inch (3.8 cm) to 2¼ inch (5.7 cm)) inventive ball mounts, drawbars and other lighter-duty, less-expensive accessories can be made exclusively for lighter-duty use, and, consequently, be incompatible for unintended, heavier-duty, automotive use.

With the corresponding hitch pin bore 48 in the shank of the ball mount, or other light-duty accessories, at the inventive distance also less than 2½ inches (6.35 cm) from the center of the bore to the insertion stopping point on the shank, the hitch pin bore hole 48 in the shank of the light-duty accessory will align with the inventive hitch pin hole 49 in the light-duty receiver R, but not align with the hitch pin bore hole in a conventional, heavier-duty, automotive hitch receiver since it will not protrude into the automotive receiver far enough to align the bore holes for connection. The result is that a standard ball mount or other accessory designed for automotive use will be compatible with both an automotive receiver and inventive light-duty receiver, but the inventive lighter-duty ball mount or other accessory will only be compatible with the inventive light-duty receiver and be incompatible for use in a standard, heavier-duty, automotive hitch receiver.

Figure 16:
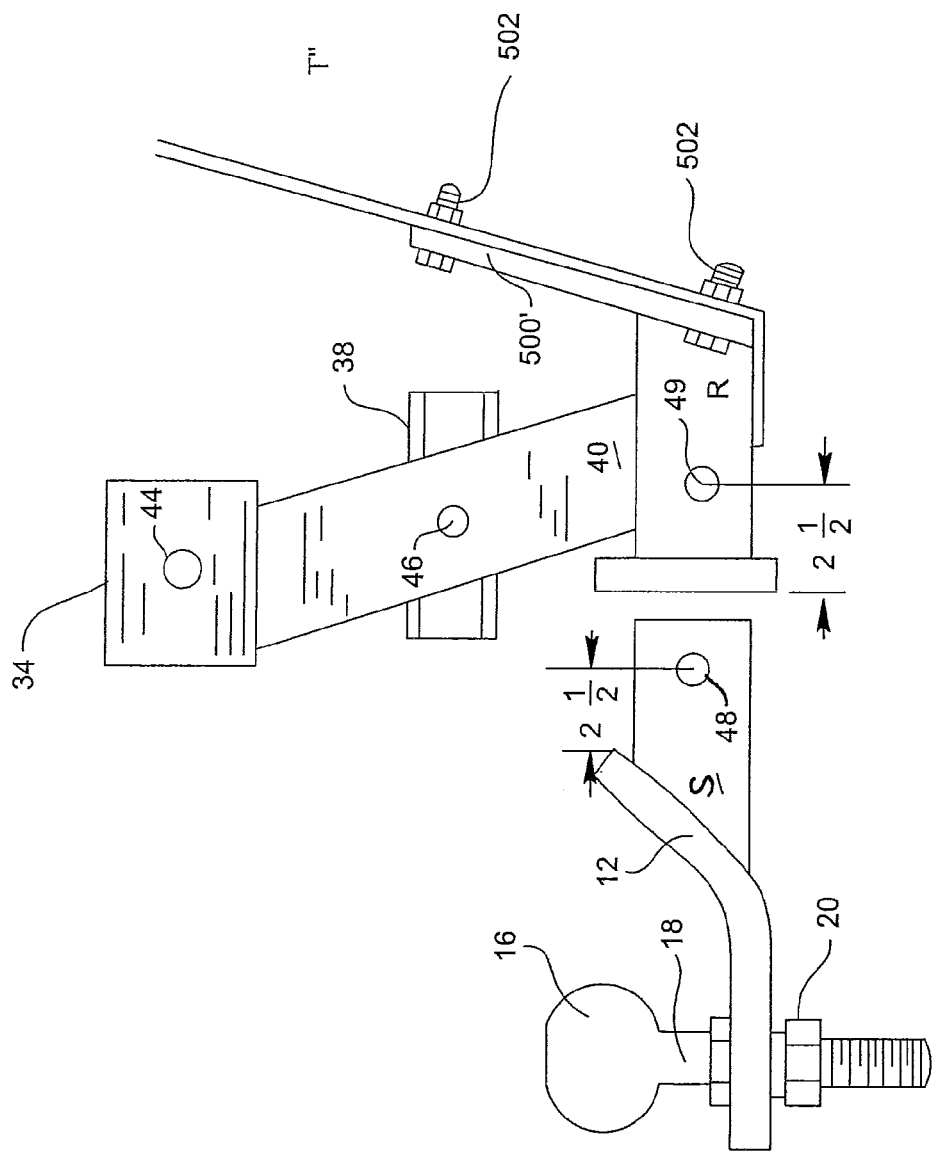
FIG. 16 is a side view of a hitch assembly of the invention.

Therefore, referring to FIG. 16, it is an aspect of this invention that at least some of the embodiments of the multi-task trailer hitch assembly include the hitch pin bore hole 48 at the inventive distance of less than 2½ inches (6.35 cm) from the center of the bore 48 to the insertion stopping point on the ball mount or accessory shank and at the inventive distance of less than 2½ inches (6.35 cm) from the center of the bore 49 to the face on the corresponding receiver tube R.

Although described using a 2-inch (5 cm) hitch assembly, this aspect of the invention is equally applicable to other size receivers and accessories by moving the standard hitch pin bore hole locations on them to a distance less than the industry standard hole location for the respective receiver and ball mount size.

Alternatively, in lieu of modifying the inventive hitch pin bore hole location, the same inventive result could be achieved by utilizing in both the receiver tube and accessory shank an inventive bore shape and hitch pin of matched shape (see 48 in FIG. 14) differing from a standard round bore hole such as but not limited to D shaped, star shaped, square shaped, pentagon shaped, hexagon shaped, octagon shaped, etc. With this practice of the invention, the inventive ball mount or other accessory would be incompatible for standard automotive use and only be compatible with the inventive off-road receiver. Therefore, at least one of the embodiments of the multi-task trailer hitch assembly may include a non-round hitch pin bore and matching hitch pin (see 48 in FIG. 14) of the aforementioned alternative shapes.

Also referring to FIG. 16, while there is a use or need for utilizing the multi-task ball mount assembly on lawn and garden tractors (e.g., towing a log splitter, lawn and garden cart, roller, aerator, etc., while attaching another accessory such as a hitch mounted basket to simultaneously transport chain saws, gas cans or other hand tools) in the current art, lawn and garden tractors are not equipped with a receiver-type hitch. Lawn and garden tractors generally have a drawbar for connecting an accessory with a bifurcated trailer tongue or for attaching a tow ball. Depending upon the gauge of steel used on the tractor's rear shroud or draw bar, the tractor may or may not be capable of adequately supporting the embodiment with a single bolt, washer, and nut as shown in FIGS. 10 and 11, as the tractor's draw bar may be susceptible to bending.

Thus, in lieu of receiver tube assembly being attached to hitch tongue extender bar 410 and secured to a tractor with a single bolt, washer, and nut and shown in FIG. 11, an assembly of receiver tubes, such as that of FIG. 1-3A, 4, 11 or 12, as shown and described above, may be attached to tractor mounting plate 500'. The assembly of this embodiment may then be attached to the rear of a tractor T" with nuts, bolts, and washers 502.

Depending upon the configuration of the tractor's rear shroud or draw bar, tractor mounting plate 500' may be anywhere between a 45° and 90° angle to the receiver tube.

Alternatively, in lieu of a standard ball mount shank S as shown in FIGS. 15 and 16 for illustrative purposes, this embodiment may employ the H-beam type ball mount shank S as shown in FIGS. 2A, 3A, 3C, 11 and 12.

The tube receivers and ball mount shanks of the present invention are preferably made of steel or other appropriate materials and may be square, round, or other shape to permit connecting accessories of matched shape. The length of all receiver tubes, support members, hitch bars, cross members, shanks, and shank expander strips may be shortened or lengthened and the distance between all receiver tubes may be increased or decreased as desired. In addition, although all ball mounts illustrated in the drawings are shown as 2 inches (5 cm) square, each embodiment may also be 1¼ inches (3.1 cm) or other appropriate size. Taillights or reflectors may be installed in the rearward opening receiver tubes of the various embodiments of the invention as described above. Gussets and other reinforcement elements (not shown) may be added as desired to the above-described embodiments of the invention and are not considered to be part of the invention.

In conjunction with the inventive multi-task trailer hitch assembly, the following list (intended to be illustrative and not exhaustive) of accessories can be attached to the trailer hitch without loss of towing capability: additional ball mounts, receiver extension/adapter/reducer, tow ring, shackle, tow hook, bicycle carrier, ski rack, canoe rack, ladder rack, luggage rack, truck extension, spare tire carrier, gas can carrier, steps, carry all, ATV carrier, grill carrier, cargo basket, ATV tie-down system, motorcycle carrier, wheel chair carrier, pet carrier, pet step, light bar, winch mount, generator stand, tree stand holder, bow holder, gun rack, fishing rod carrier, ice auger carrier, bucket carrier, crate carrier, tool carrier, tool box, cargo box, work bench, chain saw carrier, extension cord reel, garden hose reel, and seed and salt spreader.

In another aspect of the invention as shown in FIG. 3B, decorative, ornamental, or source indicating indicia 301 can be mounted, either permanently or removably, on the upper surface 302 of the ball mount assembly, such as on the ball mount platform 12. Other indicia 304, such as the ball mount assembly manufacturer or the like, can also be mounted, either permanently or removably, on the ball mount assembly, such as on a rear face 306 of the ball mount platform 12. In one exemplary embodiment, the first indicia 301 can be, for example, a vehicle logo or name that matches the vehicle to which the ball mount assembly is attached. The indicia 301 can be in the form of a conventional decal having an adhesive back that can be attached to the upper surface 302. Alternatively, the indicia 301 can be a piece having a magnetic back that can be removably attached to the upper surface 302 of the ball mount platform 12. Thus, in one aspect of the invention, the first indicia 301 can be related to or can identify with the make or model vehicle. For example, if the vehicle to which the towing assembly is attached is a Dodge Ram truck, the indicia 301 can be the word "Dodge" or the conventional ram symbol associated with Dodge Ram trucks. As will be appreciated by one skilled in the art, the ball mount assemblies for other vehicles could have other conventional identifying indicia associated with those vehicles. The other indicia 304 on the rear face 306 of the ball mount platform 12 can identify the manufacturer or seller of the ball mount assembly. The indicia 304 could be on a sticker or plate attached to the ball mount platform 12. Alternatively, the indicia 304 could be etched, forged, or formed into the metal of the ball mount platform 12 itself. As will be appreciated by one skilled in the art, a piece having a magnetic back as described above could not only be mounted on the ball mount platform 12 but also on any metallic portion of the vehicle itself, such as on the side panels or doors of the vehicle.

In some conventional ball mount assemblies, the ball mount includes large letters or other symbols identifying the ball mount manufacturer. To the vehicle owner, it may be unattractive or undesirable to have this ball mount advertising indicia prominently displayed on the rear of the vehicle. Thus, it is not uncommon for vehicle owners to remove the ball mount assembly from the collar to which it is attached and replace the ball mount with a hitch plug having, for example, emblems or symbols more aesthetically desirable. Such symbols can include, for example, the vehicle manufacturer symbol or name. However, this requires that the ball mount be removed and either stored at another location or inside the vehicle until the ball mount is needed for use. With the above-described aspect of the invention, the ball mount can be left in place for immediate use if need be without the undesirable aesthetic problems associated with conventional ball mount assemblies.

It is to be understood that the present invention is not limited to the embodiments described above but encompasses any and all embodiments within the scope of the following claims.

The invention claimed is:

1. A hitch assembly, comprising:
a shank configured to engage a hitch receiver;
an upper platform connected to the shank and having a front end, a rear end, and a ball mount attachment member, the upper platform being substantially planar and extending substantially parallel to the shank;
a lower platform having a front end and a rear end and spaced from the upper platform and extending beyond a rear of the upper platform, the lower platform being substantially planar and extending substantially parallel to the shank;
an attachment element located on the lower platform rearwardly of the ball mount attachment member, wherein the attachment element of the lower platform is a bore extending through the lower platform; and
a spacer extending between the upper platform and the lower platform, wherein the spacer is located between the front ends and rear ends of the upper and lower platforms such that an open space is located forward of the spacer between the upper platform and the lower platform.

2. The hitch assembly of claim 1, wherein the ball mount attachment member of the upper platform is a bore extending through the upper platform.

3. The hitch assembly of claim 1, wherein the lower platform includes a bore forward of the attachment element and configured to engage a shank of a ball mount.

4. The hitch assembly of claim 1, including a ball mount connected to the ball mount attachment member.

5. A hitch assembly, comprising:
a shank configured to engage a hitch receiver;
an upper platform connected to the shank and having a ball mount attachment member;
a lower platform spaced from the upper platform and extending beyond a rear of the upper platform;
an attachment element located on the lower platform rearwardly of the ball mount attachment member; and
a spacer extending between the upper and lower platforms,
wherein the lower platform includes a bore forward of the attachment element and configured to engage a shank of a ball mount, and
wherein the spacer is hollow and the ball mount shank extends through the spacer.

6. A hitch assembly, comprising:
a shank configured to engage a hitch receiver;
an upper platform connected to the shank and having a front end, a rear end, and a hitch ball connected to the upper platform, the upper platform being substantially planar, solid upper member extending substantially parallel to the shank;
a lower platform having a front end and a rear end, the lower platform spaced from the upper platform and extending beyond a rear of the upper platform, the lower platform comprising a substantially planar, solid lower member extending substantially parallel to the shank;
an attachment element located on the lower platform rearwardly of the hitch ball, wherein the attachment element comprises a bore extending through the lower member; and
a spacer extending between and in contact with the upper and lower platforms, the spacer positioned forwardly of the attachment element of the lower platform and between the front ends and rear ends of the upper platform and the lower platform such that an open space is located forward of the spacer between the upper and lower platforms.

* * * * *